United States Patent
Cho et al.

(10) Patent No.: US 6,943,315 B2
(45) Date of Patent: Sep. 13, 2005

(54) ROBOT SPOT WELDING APPARATUS FOR NUCLEAR FUEL SKELETON AND SPOT WELDING METHOD USING THE SAME

(75) Inventors: Sang Hyun Cho, Daejeon (KR); Chang Hwan Hwang, Daejeon (KR); Yong Shin Choi, Daejeon (KR); Dong Yoon Shin, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 121 days.

(21) Appl. No.: 10/437,372

(22) Filed: May 13, 2003

(65) Prior Publication Data

US 2004/0144759 A1 Jul. 29, 2004

(30) Foreign Application Priority Data

Jan. 29, 2003 (KR) .................. 10-2003-0005980

(51) Int. Cl.[7] .................. B23K 11/00; B23K 11/30
(52) U.S. Cl. .................. 219/117.1; 219/86.7
(58) Field of Search .............. 219/56, 57, 58, 219/59.1, 86.1, 125.1, 158, 159, 117.1, 86.7

(56) References Cited

U.S. PATENT DOCUMENTS

| | | | | |
|---|---|---|---|---|
| 4,111,348 A | * | 9/1978 | Laird et al. | 228/181 |
| 4,595,815 A | * | 6/1986 | Vere et al. | 219/58 |
| 5,254,835 A | * | 10/1993 | Dalke et al. | 219/125.11 |

* cited by examiner

*Primary Examiner*—Kevin P. Kerns
(74) *Attorney, Agent, or Firm*—F. Chau & Associates, LLC

(57) ABSTRACT

The automatic robot spot welding apparatus includes a welding bench including clamping frames, which are uniformly arrayed and have receiving portions for the sparer grids, and have, at both ends of the welding bench, fixing plates for the guide tubes and the instrumentation tube which are inserted into the spacer grids; a robot moving on a running rail, which is arranged in parallel to the welding bench, and having a welding gun for welding the spacer grids with the guide and instrumentation tubes; guide tube electrodes for being inserted into the guide tubes for the spot welding; an instrumentation tube electrode for being inserted into the instrumentation tube; and a controller having an apparatus control block and a robot control block for controlling components based on a program stored therein.

32 Claims, 22 Drawing Sheets

(A)

(B)

(A)

359a (B)

H (A)

(B)

ROBOT SPOT WELDING APPARATUS FOR NUCLEAR FUEL SKELETON AND SPOT WELDING METHOD USING THE SAME

BACKGROUND OF THE INVENTION

1. Field of the Present Invention

The present invention relates to a welding apparatus and a welding method for a nuclear fuel skeleton which is fabricated by welding guide tubes for power control rods and an instrumentation tube for measuring fuel to spacer grids having a plurality of cells, into which fuel rods are inserted. In particular, the welding apparatus and the welding method allow a robot having a welding gun to automatically spot-weld the guide tubes and the instrumentation tubes to the spacer grids.

2. Background of the Related Art

A nuclear fuel skeleton is a support structure for receiving fuel rods inserted into a reactor of a nuclear power plant as well as allowing inspection to reaction status of nuclear fuel. The skeleton includes spacer grids having a plurality of cells for the fuel rods and arranged at a certain span, guide tubes for control rods to be inserted into insert holes in the spacer grids and an instrumentation tube for measuring the status inside a reactor (hereinbelow, referred to as "an intra-reactor status".)

The fuel rods are inserted into spacer grid cells of this skeleton and top and bottom nozzle are coupled to both ends of the skeletons to constitute a nuclear fuel assembly. Although the number of final fuel articles is varied according to unique models of nuclear power plants, about 177 fuel assemblies of this kind are inserted into a nuclear reactor and used for about 4 years on the basis of Korean Standard Nuclear Power Plant (KSNP) fuel.

The nuclear power plant requires high stability as reminded by the accident of Chernobyl nuclear power plant of the former Soviet Union in 1986. In particular, the nuclear fuel skeletons require super high stability so that they can be directly inserted into the reactor and endure extreme conditions for a long time. It is critical for a skeleton fabrication process to obtain a precise article through a number of inspections in a number of process steps.

The spacer grids and the guide and instrumentation tubes of the skeleton are coupled via bulging or welding.

TIG welding has been used as a conventional welding method for coupling. Since the spacer grids and the guide and instrumentation tubes are made of zircaloy, TIG welding is manually performed in a closed chamber filled with Ar gas owing to properties of zircaloy. If TIG welding is performed in the air, zircaloy metal in a welding zone will combine with oxygen owing to its properties to potentially break the welding zone, thereby causing welding to be impossible.

Another reason of manual welding is due to narrow spaces between the spacer grids and the guide and instrumentation tubes. This causes it to be difficult to obtain any welding angle as well as many risks that inter-electrode contact may occur in other skeleton regions during welding.

Further, automation of welding is difficult since every grid undergoes at least 40 points of welding in each tube.

Welding between the spacer grids and the guide and instrumentation tubes are still manually performed since a skeleton with the slightest defect is not reusable and such defects cause serious economical loss.

According to the above reasons, it has been required to automate the fabrication process of skeletons with poor productivity and high cost.

SUMMARY OF THE INVENTION

The present invention has been devised to overcome the above described poor productivity due to manual operation in the conventional skeleton welding process.

Therefore, it is an object of the present invention to perform welding, in particular, spot welding to spacer grids and guide and instrumentation tubes with a welding robot having a welding gun so as to maximize automation of a skeleton fabrication process, thereby enhancing productivity of the skeleton fabrication process.

It is another object of the present invention to provide the welding gun with a tip and a tip holder having structures proper to the shape of spacer grids in a skeleton.

It is further another object of the present invention to provide desirable structures of internal electrodes which are inserted into the guide tubes and the instrumentation tube to be used in welding.

It is yet another object of the present invention to provide a welding process which adopts a robot welding apparatus to minimize the operation of the robot arm in welding as well as shorten a fabrication time.

According to an aspect of the invention for obtaining the above objects, automatic robot spot welding apparatus for use in a fabrication process of a skeleton, which spot welds guide tubes for power control rods and an instrumentation tube for measuring an intra-reactor status to spacer grids having a plurality of cells into which fuel rods are inserted, comprises: a welding bench including clamping frames, which are uniformly arrayed and have receiving portions for the spacer grids, and have, at both ends of the welding bench, fixing plates for the guide tubes and the instrumentation tube which are inserted into the spacer grids; a robot moving on a running rail, which is arranged in parallel to the welding bench, and having a welding gun for welding the spacer grids with the guide and instrumentation tubes; guide tube electrodes for being inserted into the guide tubes for the spot-welding; an instrumentation tube electrode for being inserted into the instrumentation tube; and a controller having a machine control block and a robot control block for controlling components based on a program stored therein.

BRIEF DESCRIPTION OF THE DRAWINGS

The above and other objects, features and advantages of the present invention will be apparent from the following detailed description of the preferred embodiments of the present invention in conjunction with the accompanying drawings, in which:

FIG. 2B schematically illustrates a spacer grid in another skeleton fabricated by the spot welding apparatus of the present invention;

DETAILED DESCRIPTION OF THE PREFERRED EMBODIMENT

The following detailed description will present a robot spot welding apparatus of the present invention with reference to the appended drawings. Although the specification will basically describe the spot welding apparatus for use in a KSNP skeleton shown in FIG. 2A and an 'Advanced Fuel Skeleton' shown in FIG. 2B, it is for illustrative purposes only but the scope of the invention shall not be restricted thereto.

Figure 1A:
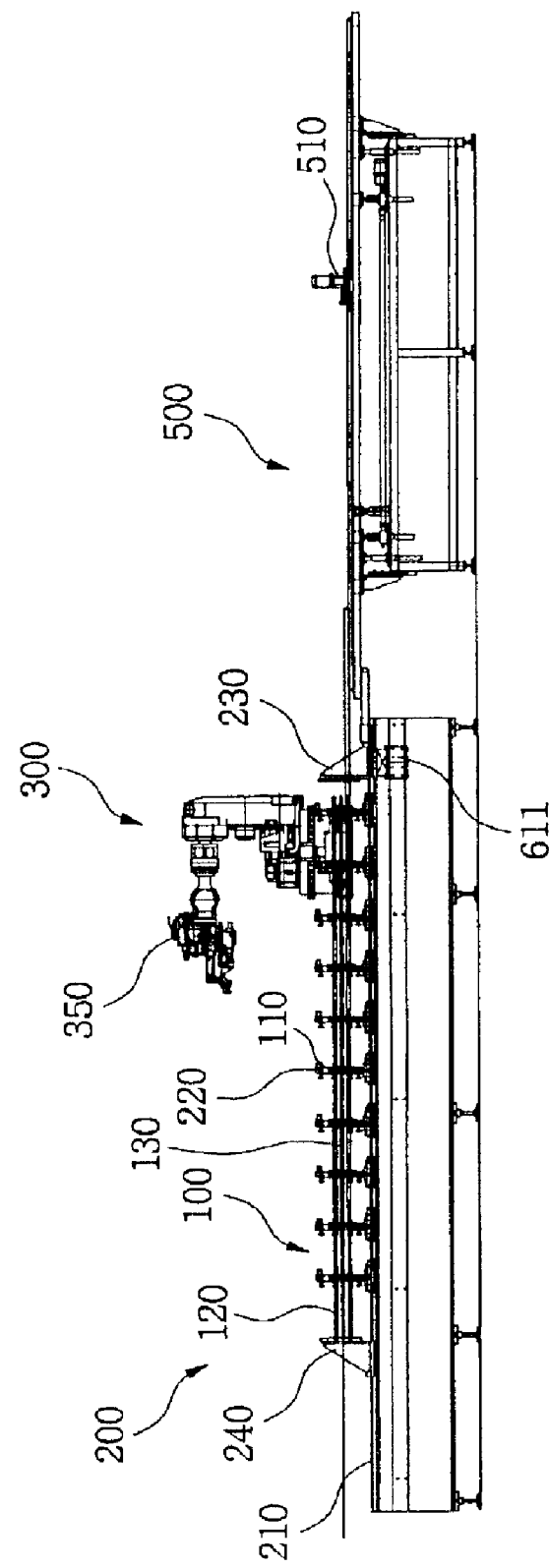
FIGS. 1A and 1B are front elevation and plan views illustrating an overall structure of a spot welding apparatus of the present invention.
Figure 1B:
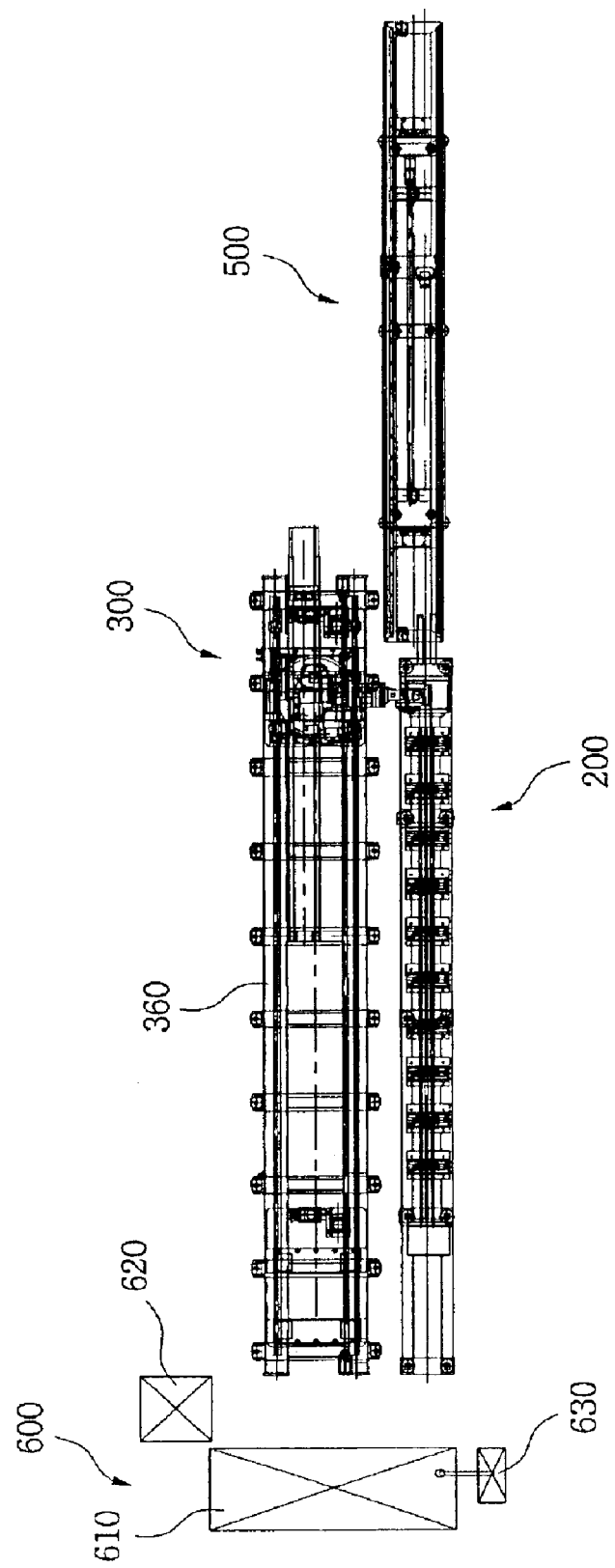

First, FIGS. 1A and 1B are front elevation and plan views illustrating an overall structure of a spot welding apparatus of the present invention.

The robot spot welding apparatus of the present invention generally comprises a welding bench 200, a robot 300, electrodes, a push table 500 and a controller 600. The welding bench 200 has clamping frames 220 which are spaced from one another according to a span of spacer grids 110 constituting a skeleton 100. The robot 300 is arranged in parallel at the rear of the welding bench 200 at the drawing and having a welding gun 350. The electrodes are inserted into guide tubes 120 and an instrumentation tube 130 for welding the spacer grids 110 with the guide tubes 120 and the instrumentation tube 130. The push table 500 is arranged colinear with the welding bench 200, and serves to introduce the tubes 120 and 130 into each tube locations 117a to 117d and 119 in the spacer grids 110 in horizontal positions matching the height of the tube location to be inserted. The controller 600 serves to control components of the robot spot welding apparatus.

For the sake of convenience, herein the term "upper part" will be used to refer to a portion adjacent to the welding bench 200 where the push table 500 is located and "lower part" to refer to an opposite portion thereof.

As above explained, the spacer grids constituting the nuclear fuel skeleton have various types which are different according to states, plant types and manufacturers.

Figure 2A:
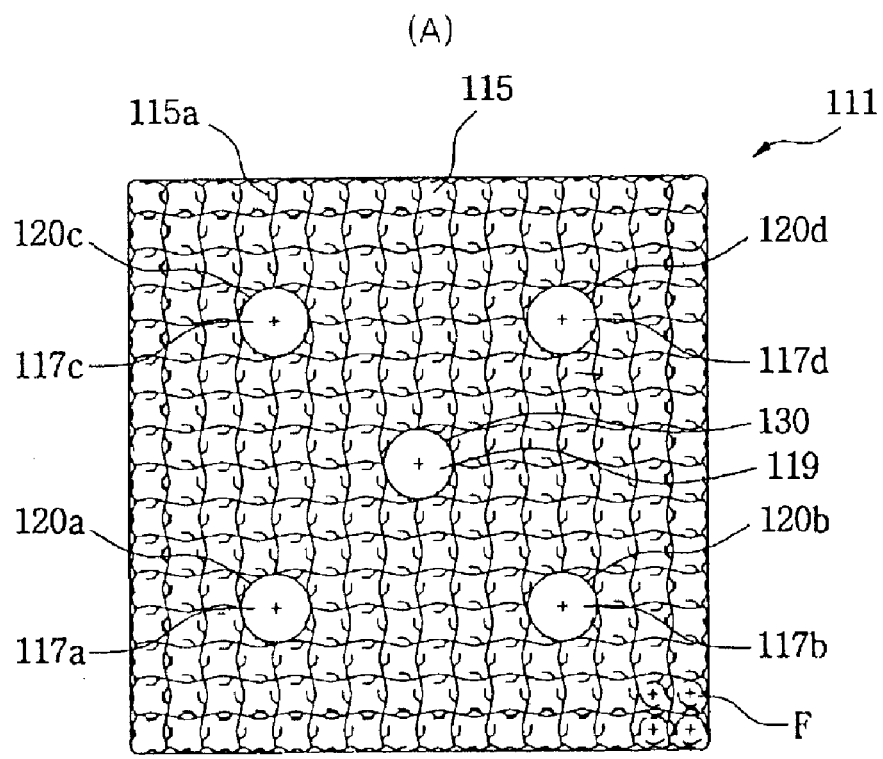
FIGS. 2A and 2B schematically illustrates a spacer grid in a skeleton fabricated by the spot welding apparatus of the present invention.

FIG. 2A illustrates one of the spacer grids 111 of the skeleton according to Korean Standard Nuclear Power Plant (KSNP).

As can be seen in a front elevation view (A) of FIG. 2A, the spacer grid 111 is made of zircaloy plates which are alternately arranged and then welded via laser. Springs 115a are projected from respective cells 115 in the spacer grid 111 for fixation of fuel rods F each inserted into each cell 115.

As shown in a side elevation view (B) of FIG. 2A, for the purpose of secure fixation of the fuel rods F, two dimples 115b are formed in each wall of the cells 115, making total eight dimples 115b.

In (A) of FIG. 2A, the spacer grid 111 includes a tube location 119 for the instrumentation tube 130 and tube locations 117a to 117d for the guide tubes 120a to 120d.

In (B) of FIG. 2A, welding points W are marked on inner regions of the spacer grid 111 and the tubes 120 and 130. In conventional TIG welding, however, welding has been performed in outer regions where the tubes contact with both ends of the cells rather than the inner region.

One KSNP type skeleton 100 utilizes 10 spacer grids, and tubes and fuel rods have following specifications:

The guide tube 120 has active length of about 4, 104 mm, O.D.(Outside Diameter) of about 25.98(23.27)mm and I.D. (Inside Diameter) of about 23.93(21.23)mm, and is made of zircaloy 4.

The instrumentation tube 130 has active length of about 4,164 mm, O.D. of about 24.89 mm and I.D. of about 22.86, and is made of zircaloy 4.

The fuel rod has active length of about 4,030 mm, O.D. of about 9.7 mm and I.D. of about 8.43 mm.

Figure 2A:
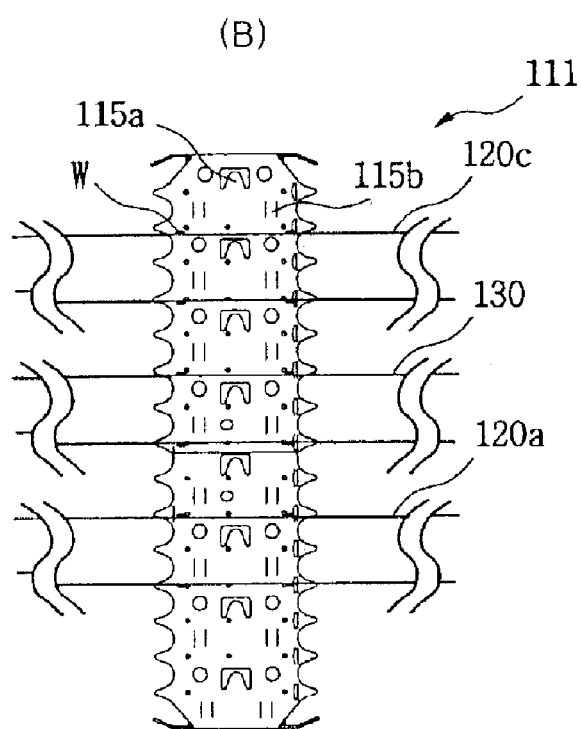
Figure 2B:
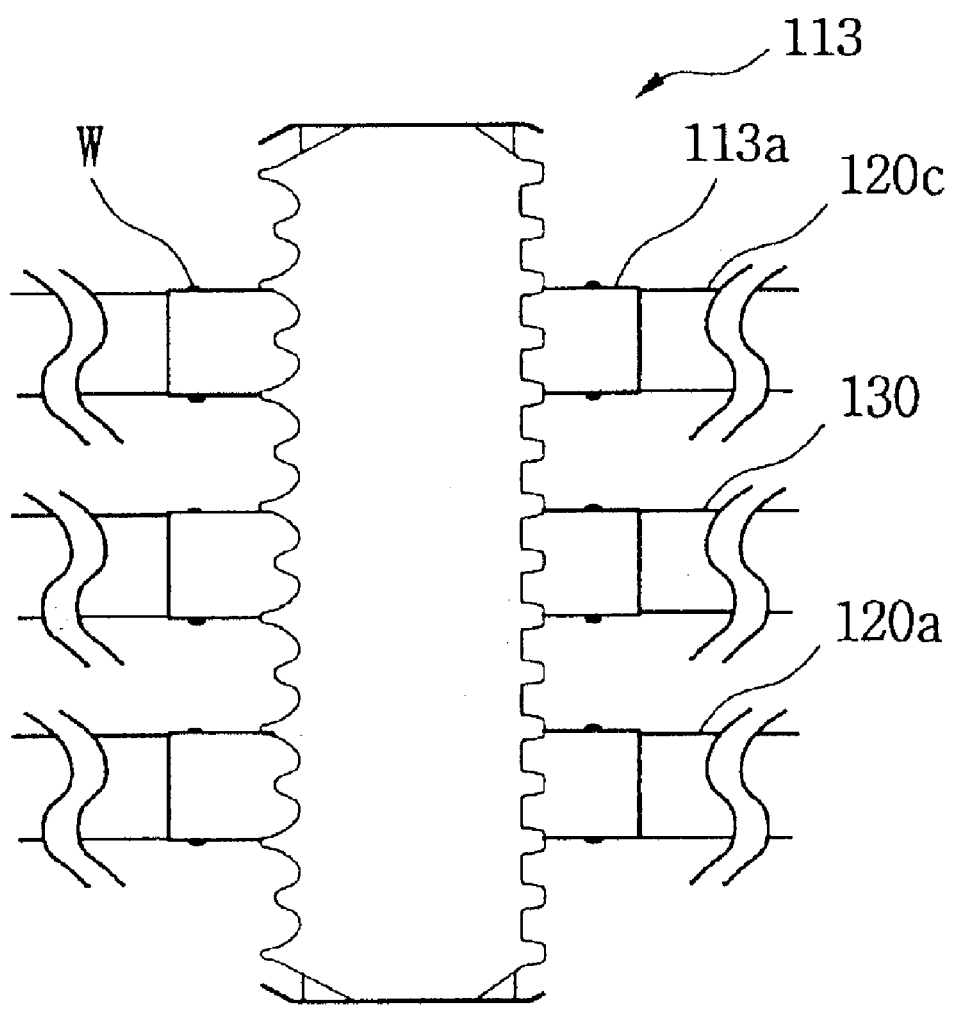

FIG. 2B is a schematic side elevation view of one of the spacer grids 113 adopted to an 'Advanced Fuel Skeleton' which will be mass-produced. The shape and number of dimples are quite different from those of the KSNP type in FIG. 2A. Also, the spacer grid 113 is welded with the guide tubes 120 and the instrumentation tubes 130 through sleeves 113a which are previously coupled to the grid. (Welding points are designated with W.)

This skeleton is improved in design by collectively considering various conditions such as vibration, combustion efficiency and durability of a nuclear reactor.

The 'Advanced Fuel Skeleton' utilizes total 11 spacer grids 113.

Figure 3A:
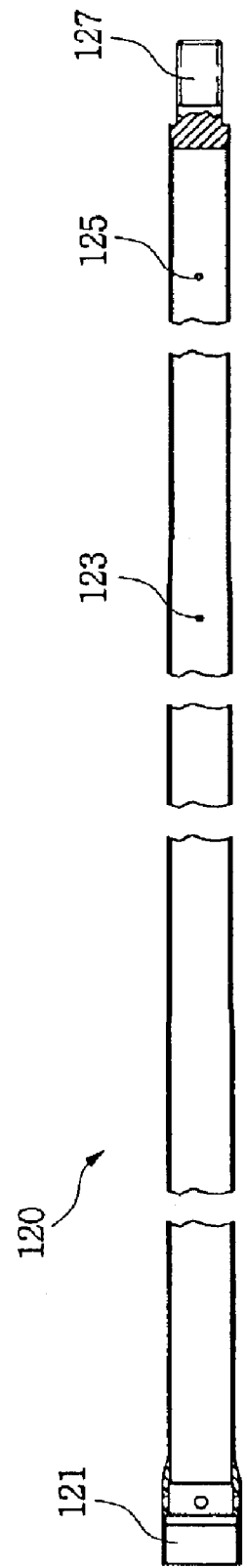
FIGS. 3A and 3B are front elevation view of a guide tube and an instrumentation tube.

The guide tubes 120 of the skeleton 100 are inserted into the tube locations in the spacer grids 113 and welded thereto. As shown in FIG. 3A, one of the guide tubes 120 is provided at one end with a flange 121 for connection with an upper end fixing body (not shown) in subsequent formation of a skeleton combination, and connected at the other end with a plug 127 for connection with a lower end fixing body (not shown) in formation of the skeleton combination. The guide tube 120 also includes a flow hole 123 for cooling water and a damping hole 125 for executing a output control rod in the nuclear reactor.

The guide tube 120 affords a space through which a control rod assembly of nuclear fuel is inserted and drawn out. Examining the overall configuration of the guide tube 120, it can be seen that the guide tube 120 has reduced diameter portions and extended diameter portions slightly wider than the nominal diameter portions, which are alternately formed in order to absorb kinetic energy in drop of the control rod.

Figure 3B:
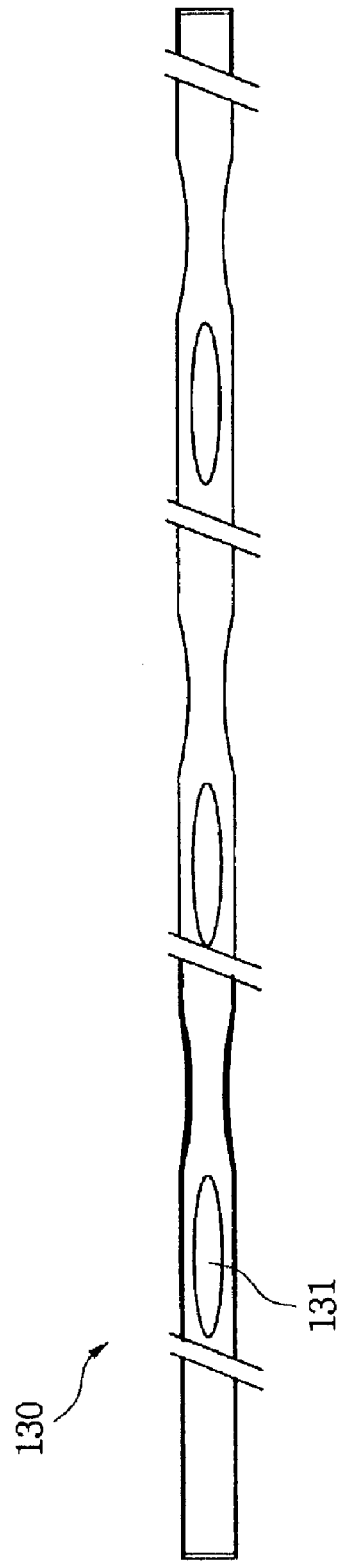

As shown in FIG. 3B, the instrumentation tube 130 has about 20 pairs of dimples, which are alternately arranged from one another, and two dimples in each pair are arrayed at 180 deg. in respect to each other. The instrumentation tube 130 serves as a path for transfer of a measuring instrument for monitoring the state of nuclear reaction of the fuel rod in the reactor. The shape of the instrumentation tube 130 is well known through various experiments.

The welding apparatus of the present invention serves to weld the skeleton including the spacer grids 110, the guide tubes 120 and the instrumentation tube 130 which are described above. First, the welding bench 200 of the welding apparatus of the present invention will be described hereinafter FIGS. 4A and 4B.

The clamping frames 220 are arranged on an upper plate 210 of the welding bench 200, which are manufactured corresponding to the standard of the spacer grids 110. The spacer grid designated with dotted lines in a lower part serves the 'Advanced Fuel Skeleton'.

Figure 4A:
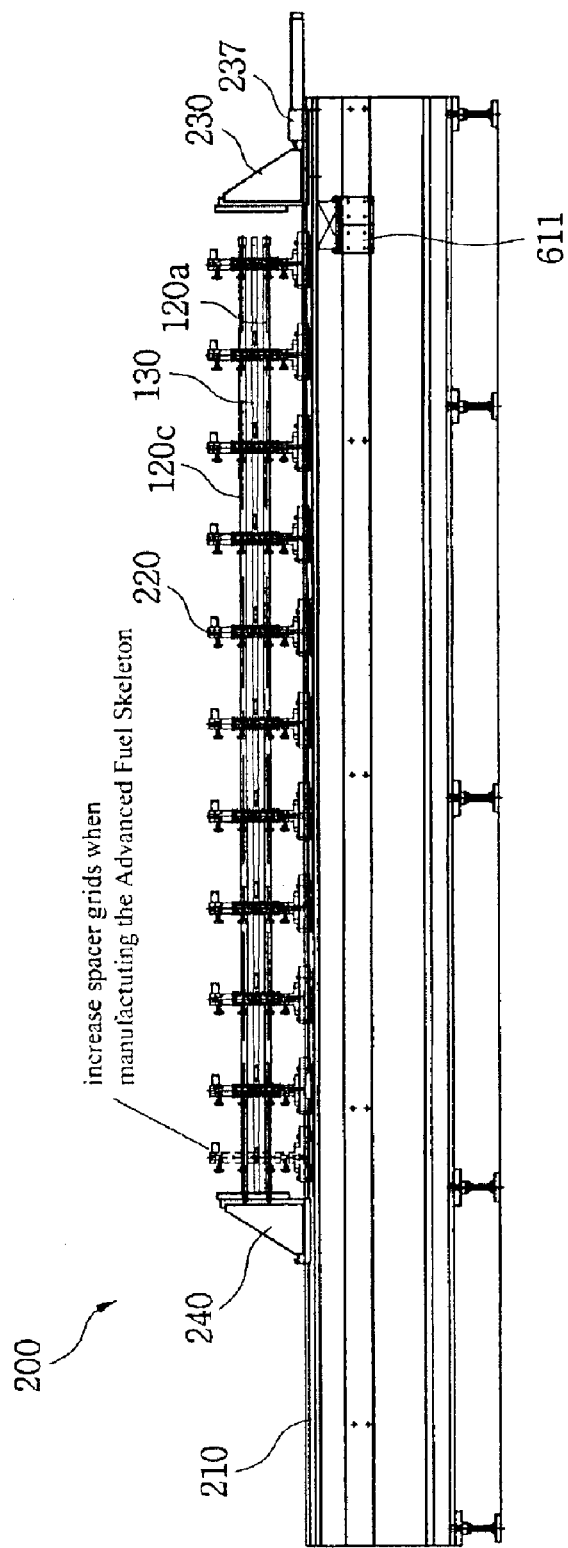
FIGS. 4A and 4B are front and side elevation views of a welding bench.
Figure 4B:
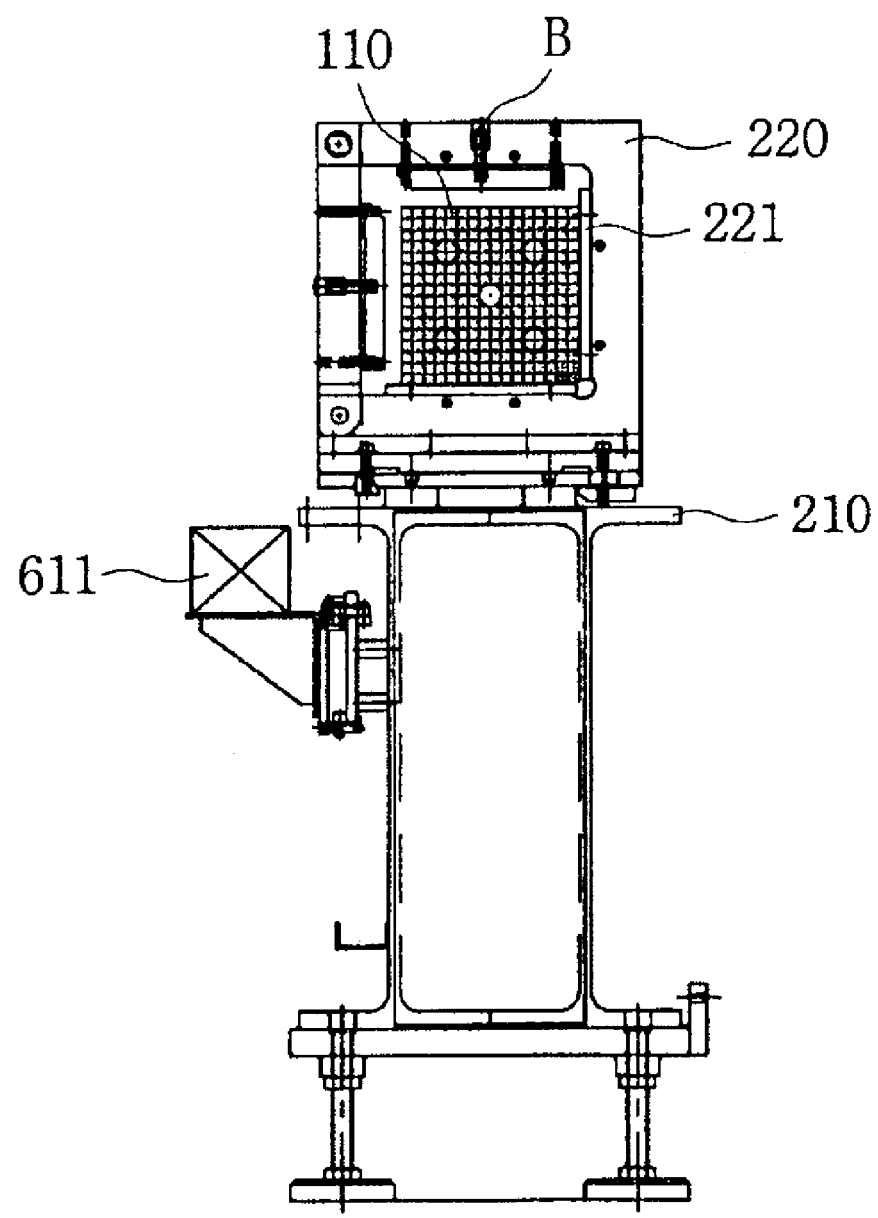

As shown in FIG. 4B, each of the clamping frames 220 has a receiving portion 221 into which each of the spacer grids 110 is fixedly inserted. The spacer grid 110 inserted into the receiving portion 221 is fixed by turning bolts B in a side and a top of the clamping frame 220 with a torque wrench.

Referring again to FIG. 4A, upper and lower fixing plates 230 and 240 are arranged at both ends of the clamping frames 220 on the upper plate 210. The fixing plates 230 and 240 serve to fix the guide tubes 120 and the instrumentation tube 130 which are inserted into spacer grids 110.

Figure 5A:
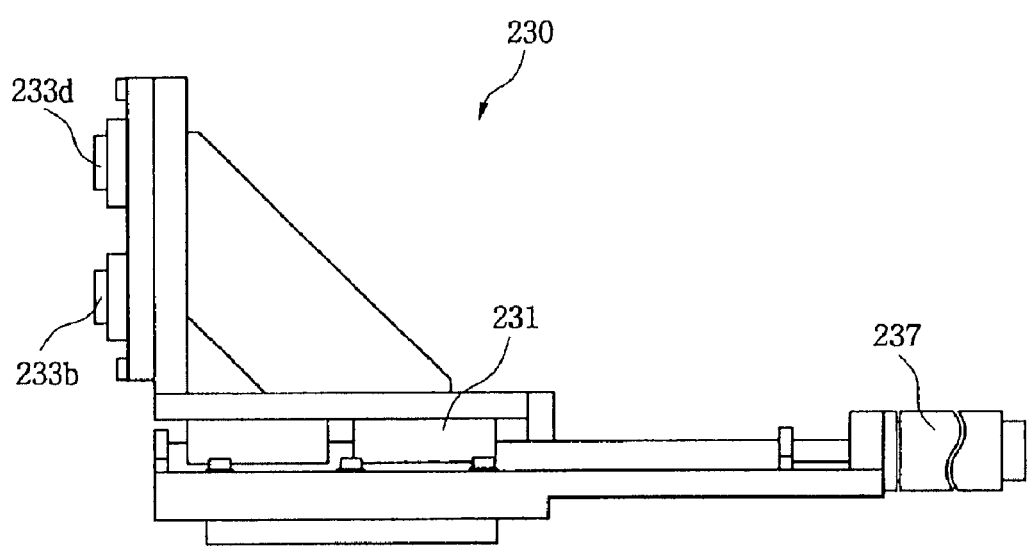
FIGS. 5A and 5B are front and side elevation views of an upper fixing plate arranged in the welding bench.
Figure 5B:
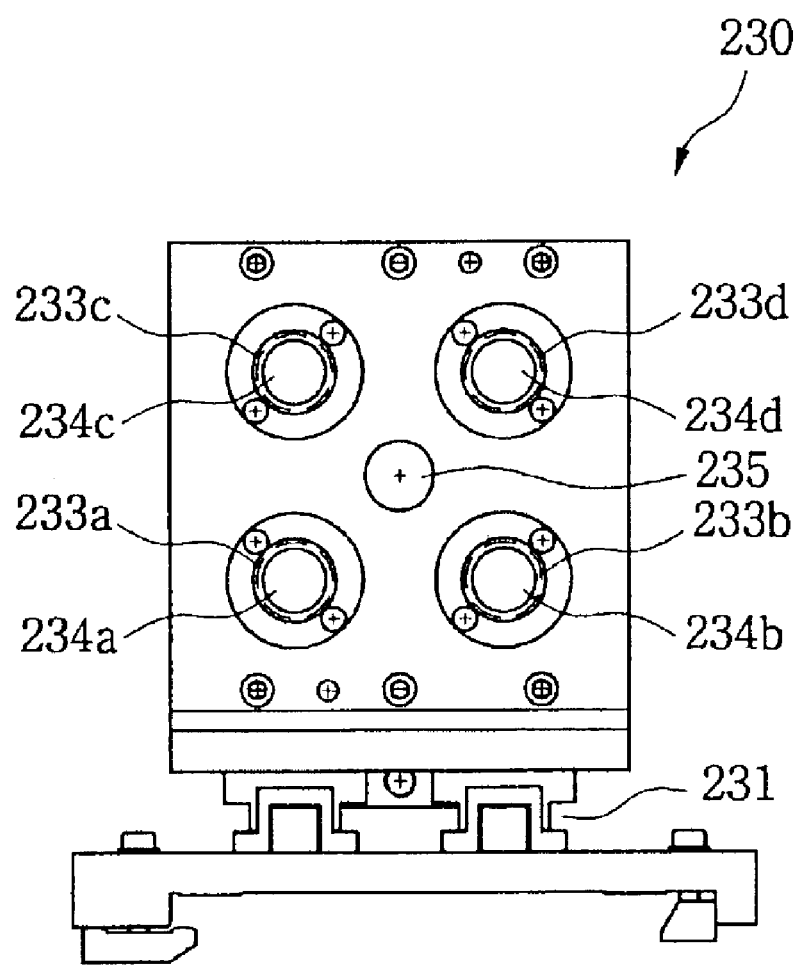

The upper fixing plate 230 adjacent to the push table has a configuration shown in FIGS. 5A and 5B.

The upper fixing plate 230 is automatically or manually reciprocated on a guide rail, in particular, an LM guide 231 in response to the operation of a cylinder 237 which is controlled by a control panel 611 of the controller 600 in the bench 200.

Figure 6A:
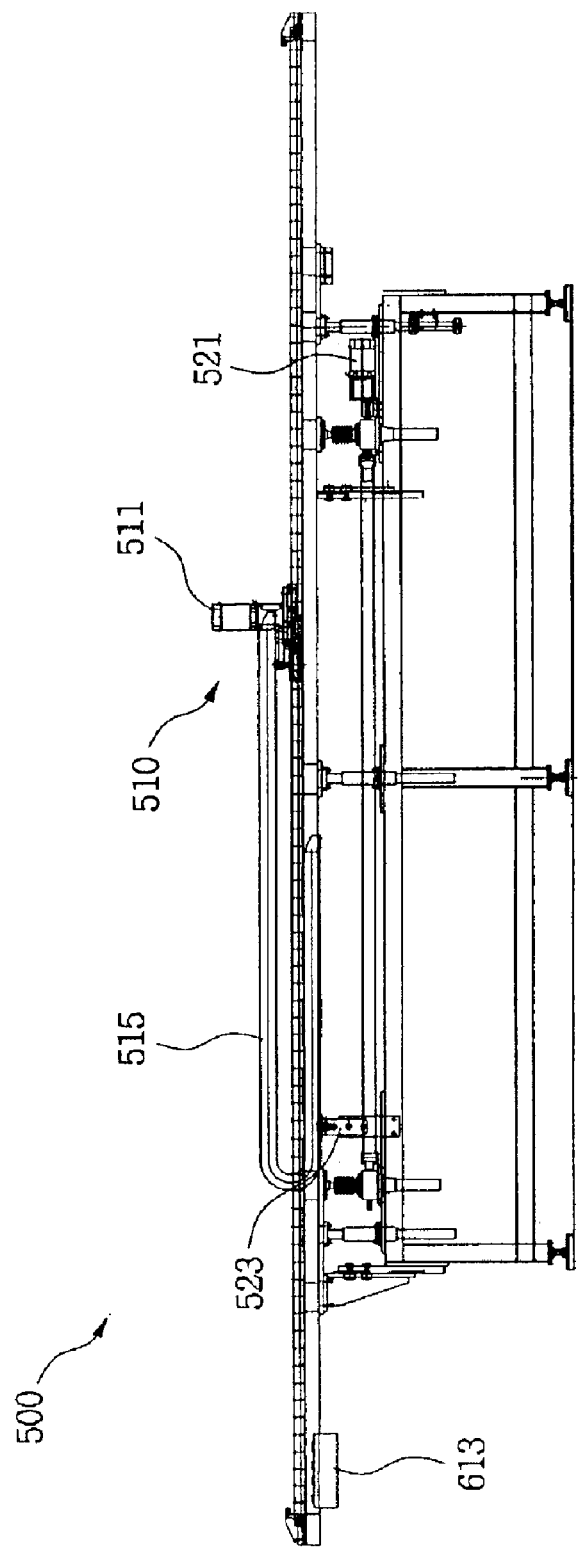
FIGS. 6A and 6B are front elevation and plan view of a push table.
Figure 6B:
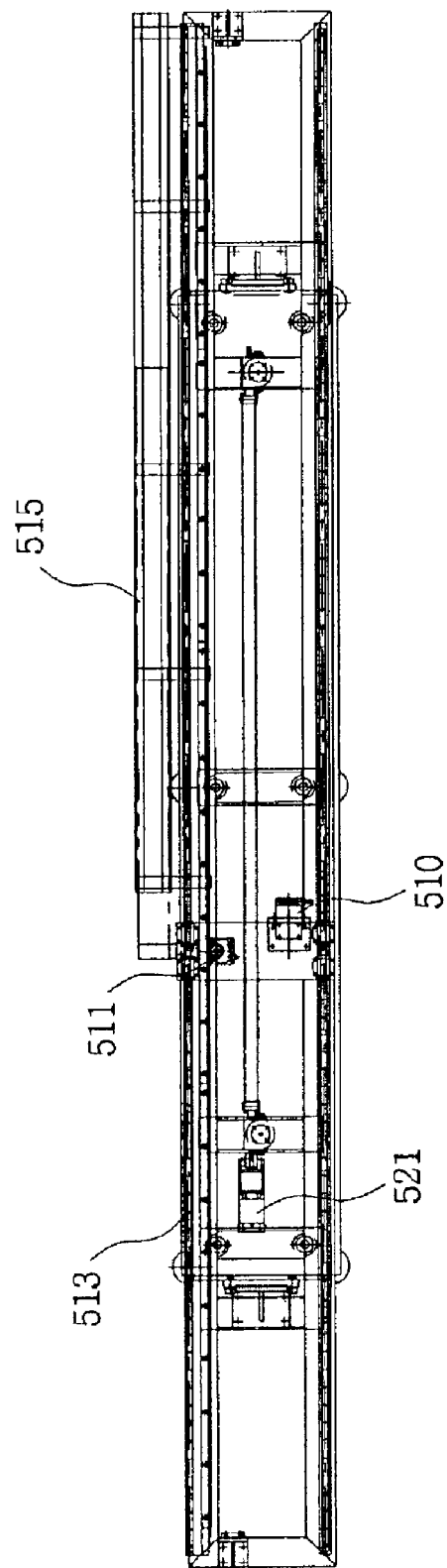

Alternatively, the cylinder 237 can be controlled with a control panel 613 in the push table 500 so that an operator can easily monitor the operating situation in a position adjacent to the cylinder 237 (FIGS. 6A and 6B). The latter is adopted in the embodiment. However, it will be construed that this may not restrict the scope of the present invention.

As more apparently seen in FIG. 5B, the plate 230 has protrusions 233a to 233d with holes 234a to 234d perforated therein. The plate 230 also has a hole 235 for the instrumentation tube corresponding to the shape of the spacer grids 110.

Preferably, the holes 234a to 234d formed in the protrusions 233a to 233d for the guide tubes 120 have a diameter identical with an outer diameter of the flange 121 (FIG. 3A) in each of the guide tubes 120. As a result, the holes 234a to 234d can support the inserted guide tubes 120 in a rock-free state so as to prevent deformation of the tubes 120 in welding.

In FIG. 5B, the hole 235 for the instrumentation tube 130 is formed with a proper size of diameter regarding the magnitude of the dimples 131 in the instrumentation tube 130.

Figure 5C:
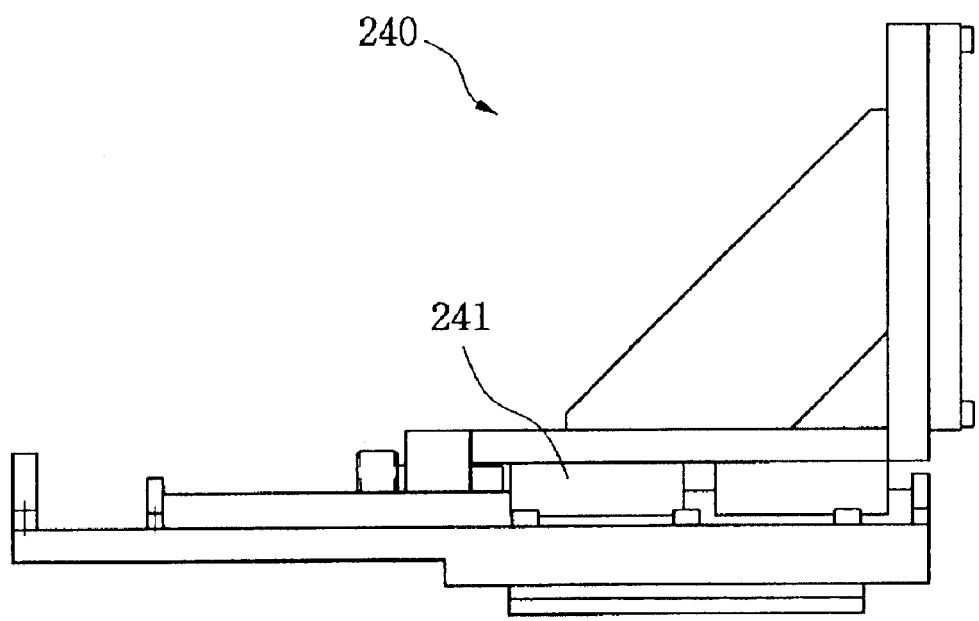
FIGS. 5C and 5D are front and side elevation views of a lower fixing plate arranged in the welding bench.
Figure 5D:
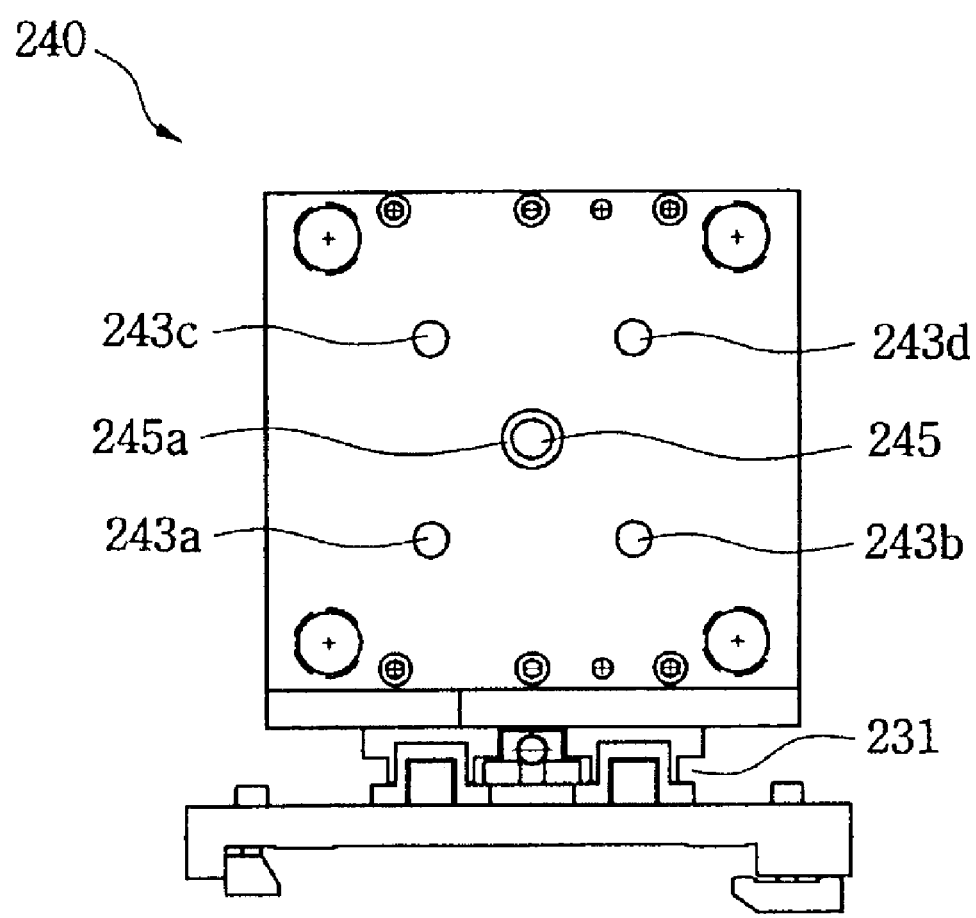

FIGS. 5C and 5D illustrate the lower fixing plate 240. The lower fixing plate 240 is manually reciprocated on the LM guide 241 since it is not required to automate movement of the lower fixing plate 240. The plate 240 has bolt holes 243a to 243d into which bolts can be screwed to couple with the guide tubes 120.

Unlike the upper plate 230, the bolt holes 243a to 243d function to more securely fix the guide tubes 120. The bolt holes 243a to 243d prevent deformation of the guide tubes 120 due to residual stress between the each spacer grid and the guide tubes 120 upon insertion thereof and heat stress in welding as well as ensure more precise location of the guide tubes 120. To this end, threads are preferably formed in inner peripheries of plugs 127 in the guide tubes 120 (FIG. 3A).

The reference number 245 designates a protrusion for the instrumentation tube 130, which is defined by an annular groove 245a around the protrusion 245 and coplanar with the plate 240.

Then, as shown in FIGS. 6A and 6B, the robot spot welding apparatus of the present invention further comprises the push table 500 colinear with the welding bench 200 in order to facilitate insertion of the guide tubes 120, the instrumentation tube 130 and the electrodes.

The push table 500 includes an insert tool 510, a position sensor (not shown), a motor 521 and the control panel 613. The insert tool 510 is reciprocated on the LM guide 513 by a motor to insert the tubes into the tube locations 117 of the spacer grids 110. The position sensor automatically detects the position of the grids in welding the instrumentation tube to enlarge an electrode for the instrumentation tube. The motor 521 adjusts the height of the table 500 in response to signals from the position sensor 523 for vertically driving the table. The control panel 613 is equipped in the controller 600 to adjust forward and reverse rotation of the motors 511 and 521.

The motor 511 of the insert tool 510 is preferably controlled with a control stick in the control panel 611 of the welding bench so that the operator can easily monitor the operating situation in a nearby position as in a controlling method of the cylinder 237 in the upper plate 230.

The reference number 515 is a duct for transfer of a control cable of the insert tool 510.

The height adjustment motor 521 adjusts the height of the table 500 corresponding to each of the tube locations 117a to 117d in the spacer grids 110.

In the welding apparatus of the above structure, the spacer grids 110 are fixed to the clamping frames 220 of the welding bench 200, and the guide tubes 120, in particular, the first and second guide tubes 120a and 120b in the tube locations 117a and 117b are inserted into the spacer grid. Then, the electrodes are inserted for welding.

Figure 7A:
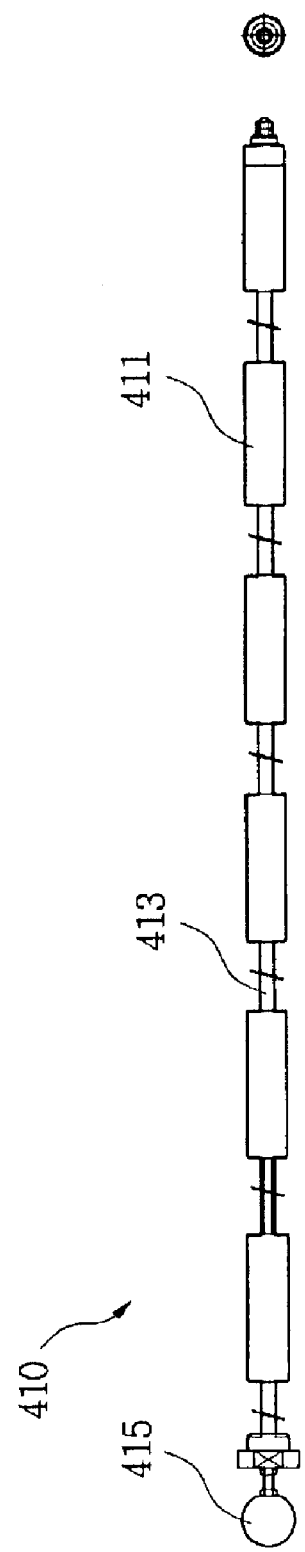
FIGS. 7A and 7B are front elevation views of electrode rod for the guide tube and the instrumentation tube.

FIG. 7A illustrates one of the electrodes 410 for the guide tubes 120. This electrode 410 includes electrode members 411 and support rods 413 connecting between the electrode members 411. The number of the electrode members 411 is same as that of the spacer grids 110 of the skeleton 100, When inserted into the guide tubes 120, the electrode 410 is placed in a corresponding position for the spacer grids 110.

The reference number 415 designates a handle, which is used to manually insert the electrode 410 into each of the guide tubes 120.

Figure 7B:
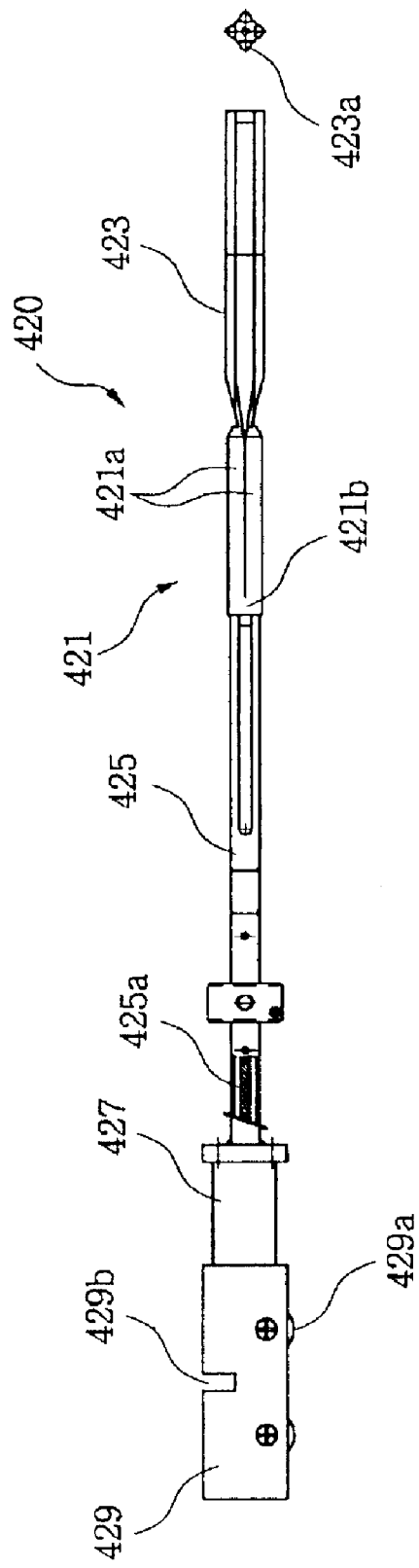

FIG. 7B illustrates an electrode 420, in particular, for the instrumentation tube 130 having the dimples 131.

The electrode 420 includes an electrode member 421 with sections 421a connected via elastic means 421b, an expansion mechanism 423 inserted into the electrode member 421 to separate the sections 421a to expand the diameter of the electrode member 421 so that the electrode 420 can fill the inside of the instrumentation tube 130, and a cylinder 427 for reciprocating a pulling bar 425a in a support tube 425 connected to the expansion mechanism 423 in response to signals from a sensor for detecting the position of the electrode member 421.

The sections 421a of the electrode member 421 are formed by quartering a cylindrical bar in a longitudinal direction. The expansion mechanism 423 has rectangular protrusions 423a corresponding to the sections 421a.

The concept of the electrode 420 that is reversibly expansible in diameter is devised because the electrode is not movable due to the dimples 131 in the instrumentation tube 130 which has the inner diameter same as that of the electrode In particular, the sections 421a are integrally coupled at ends thereof opposite the expansion mechanism 423 to form the elastic means 421b of the electrode member 421. Owing to the elastic means 421b, when the expansion mechanism 423 is pulled out of the tube, the rectangular protrusions 423a of the expansion mechanism 423 are fitted between faces of the sections 421a contacting with each other to spread the sections 421a as spokes in an umbrella thereby expanding the electrode member 421.

Of course, the elastic means can be embodied by arranging coil springs (not shown) in the contact faces of the separated sections 421a. Also the elastic means can adopt other various means known to the skilled in the art.

The electrode member 421 of the instrumentation tube electrode 420 is required to be placed in each of the spacer grids 110 of the skeleton 100 which is welded while being moved in spot welding. To this end, the electrode 420 includes a fastener 429 with wheels 429a adjacent to the cylinder 427. The fastener 429 has a groove 429b, which allows connection between the electrode 420 and the insert tool 510 of the push table 500 which was described with reference to FIG. 6A.

As a result, rotation of the motor 511 in the insert tool 510 causes the insert tool 510 to reciprocate along the rail 513, resulting in reciprocation of the electrode 420. The position sensor in the insert tool 510 detects dog blocks in an upper portion of the push table to confirm whether the electrode 420 is placed in the each spacer grid 110, and transmits a detection signal to the controller 600. Detection of the signal executes operation according to a control program. The dog blocks are installed in regions of the table 500 where the spacer grids 110 are placed. It is preferred that the dog blocks can be repositioned in change of skeleton models.

Figure 8A:
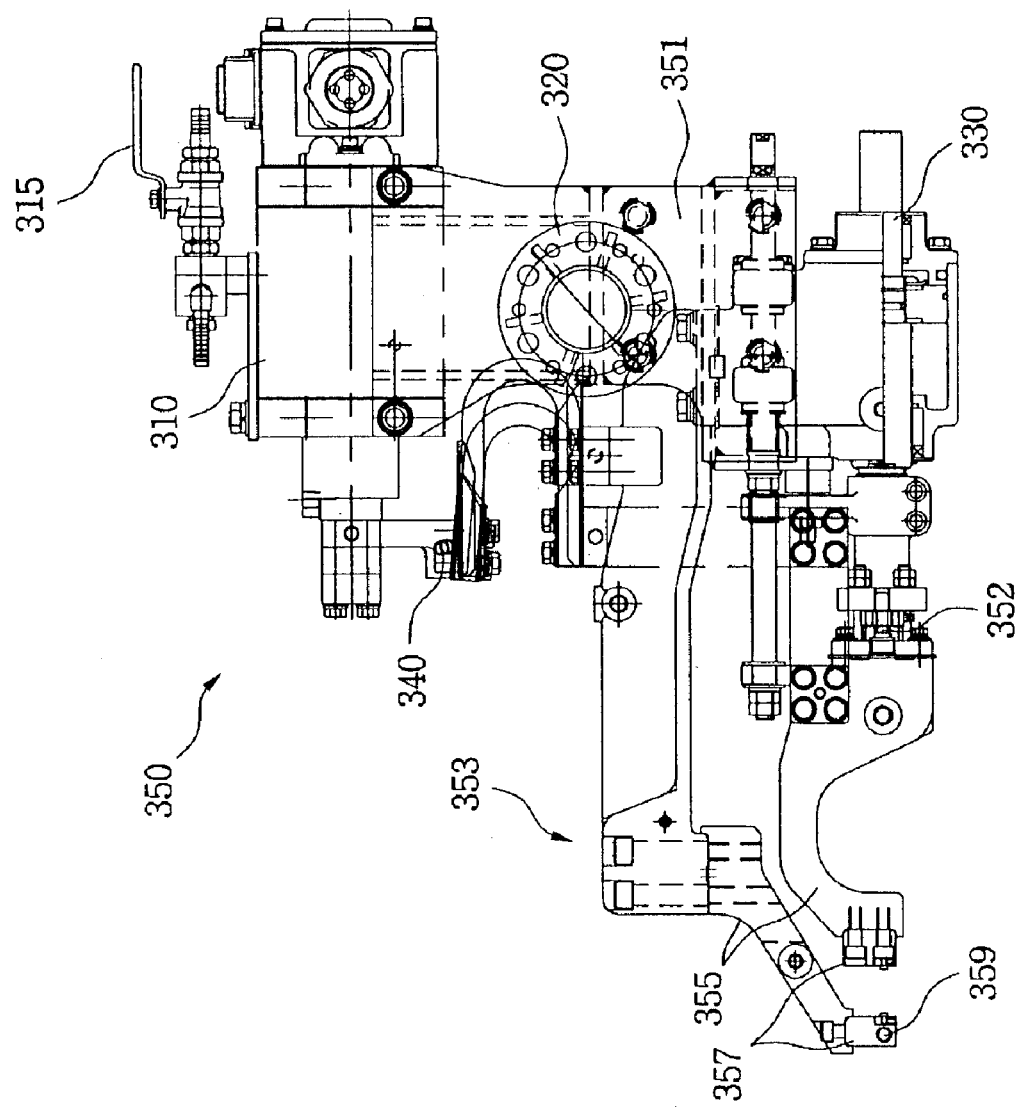
FIGS. 8A to 8C are side elevation, plan and rear views of a robot welding gun.
Figure 8B:
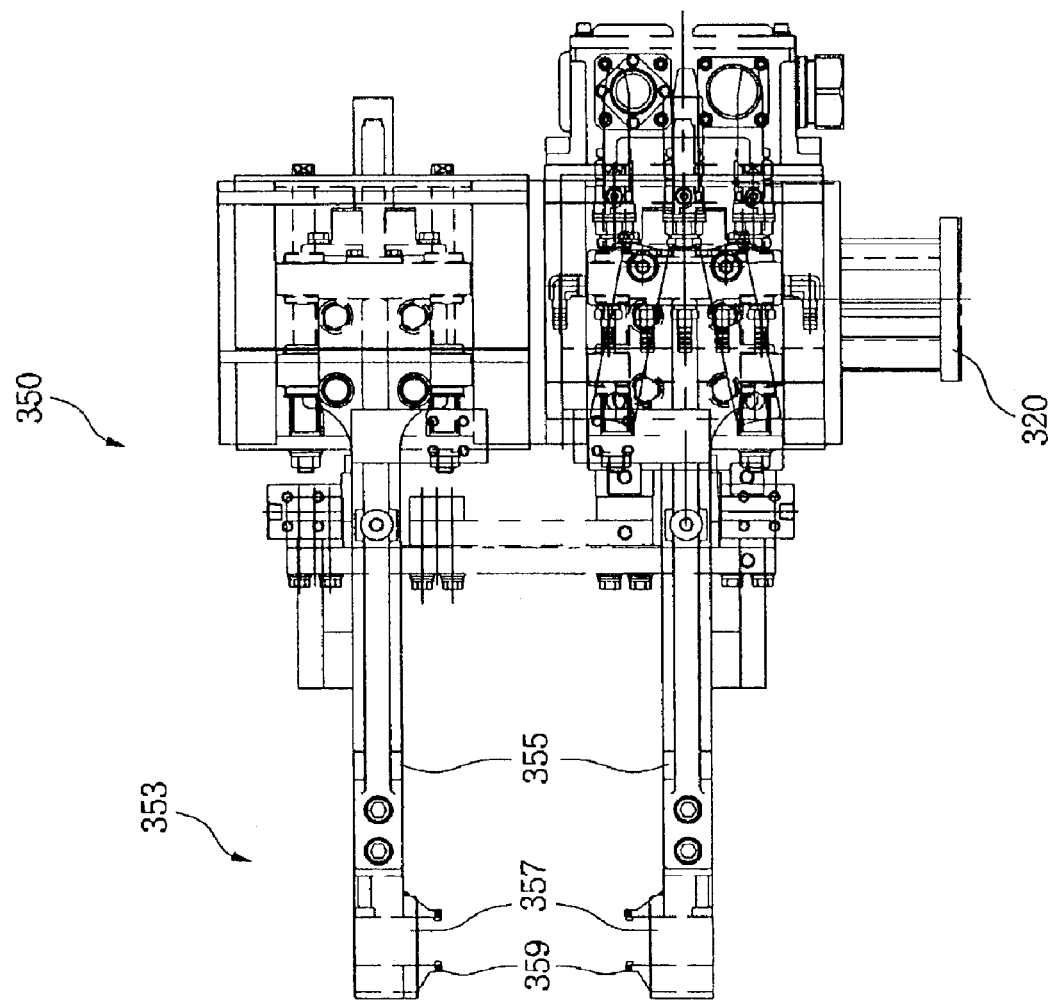
Figure 8C:
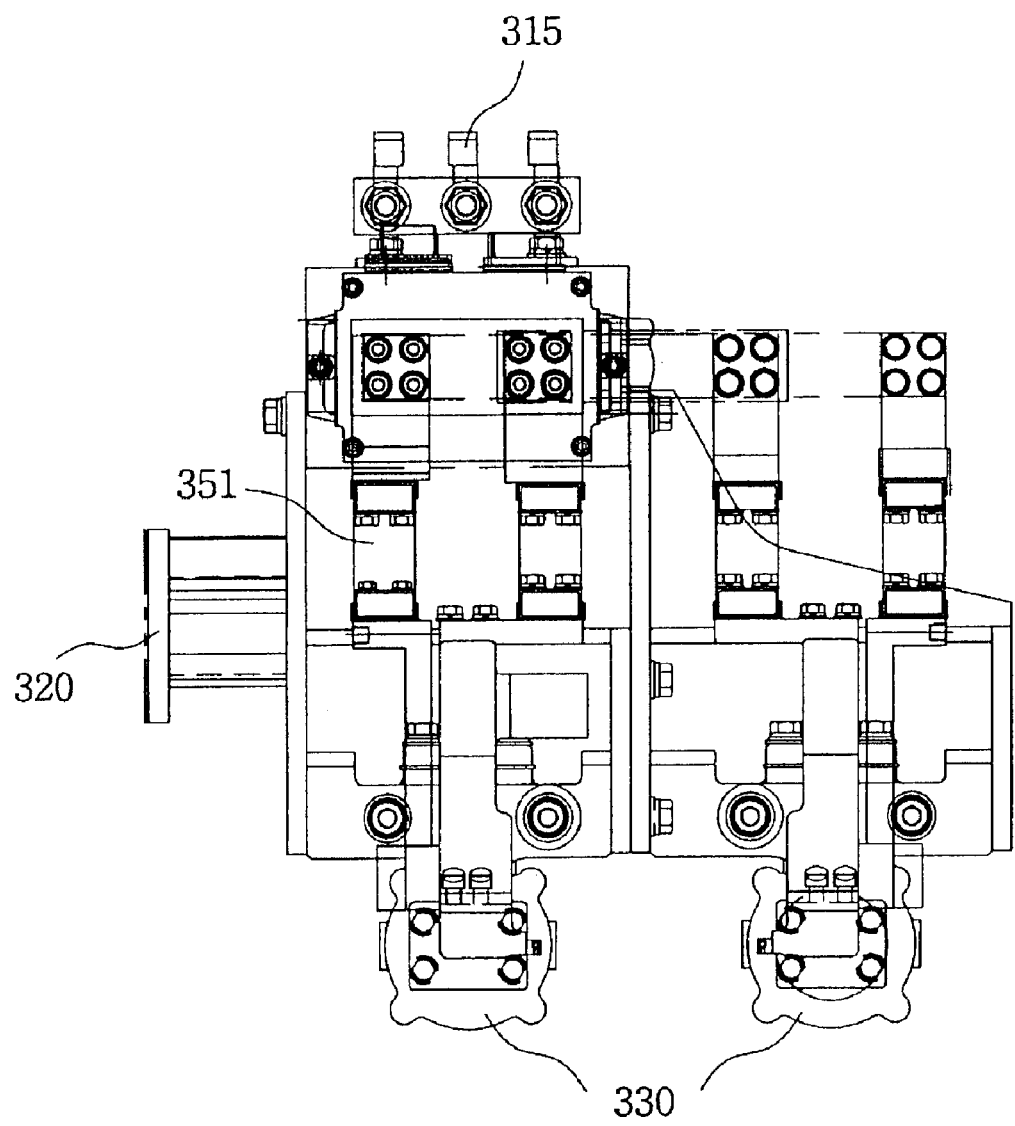

FIGS. 8A to 8C illustrate a welding gun 350 in the spot welding robot 300 shown in FIG. 1A. As shown in FIG. 1B, the robot 300 welds the spacer grids 110 with the guide tubes 120 and the instrumentation tube 130 while moving along a running rail 360 parallel to the welding bench 200. The robot 300 utilizes a seven axes multijoint robot available from Kawasaki in Japan. (The control panel uses C52G-A002, S/N UB1501214, and the robot uses UB150G-A005, S/N UB1501214.) Such industrial robots are generally known in the art, and thus they will be briefly described herein.

A transformer 310 serves to generate welding current, and a robot adaptor unit 320 connects the welding gun 350 to a robot joint. A welding gun-driving cylinder 330 is an air cylinder for driving a welding tip 359. A shunt 340 serves to feed current to a welding holder which moves in operation of the driving cylinder 330. In FIG. 8A, a valve 315 is provided in an upper part of the welding gun 350 to circulate cooling water from the holder 357 and the tip 359 of the welding gun 350 through an inner spacer thereof so as to cool heat from the welding gun.

As can be seen in FIGS. 8A and 8B, the welding gun 350 of the robot 300 includes a welding gun frame 351 and an arm 353. The arm 353 includes holder mounts 355, tip holders 357 and welding tips 359, in which the tip holders 357 connect between the driving cylinder 330 and tip holders 357.

The reference number 352 designates a unit for measuring the pressure of the cylinder 330. The pressure-measuring unit 352 allows welding when the pressure of the tips 359 at a welding point meets a reference value.

The present invention modifies the tips 359 of the robot 300 for spot welding of the skeleton 100.

Figure 9A:
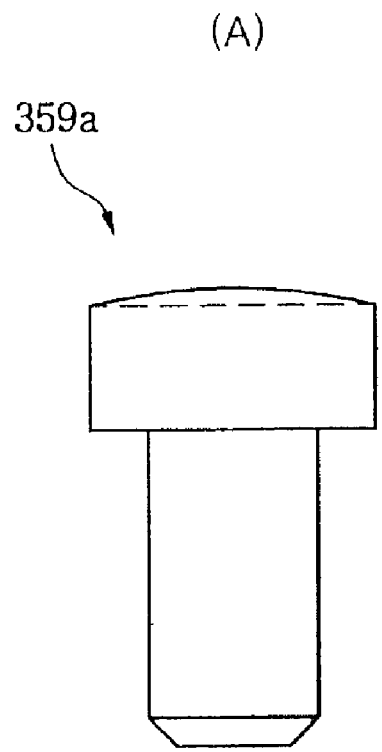
FIG. 9A is side elevation and plan views of a welding gun tip.
Figure 9A:
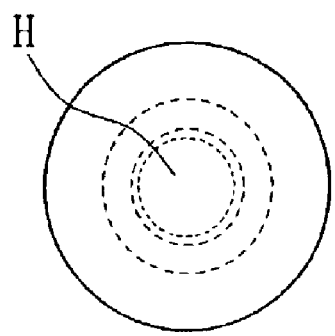
Figure 10:
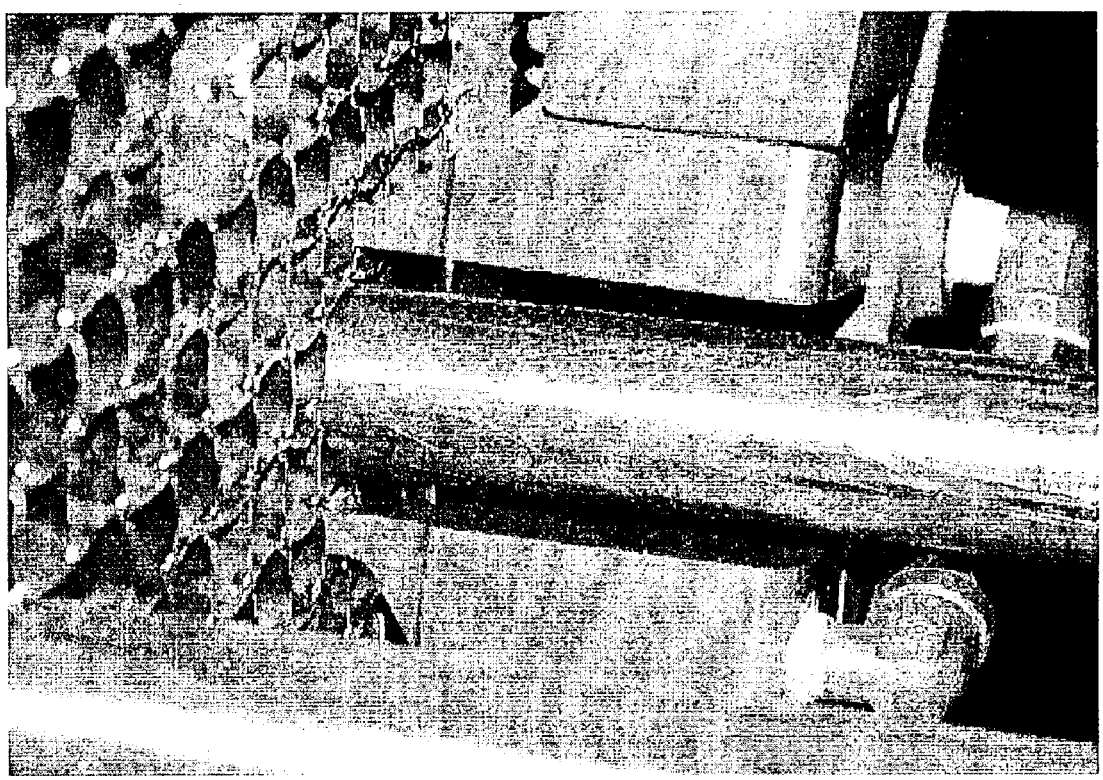
FIG. 10 is an actual picture showing the guide tube welded to the spacer grid by the robot welding apparatus of the present invention.

First, the welding gun has a tip 359a, as shown in FIG. 9A, which is used for a skeleton type where the welding points W are formed in the cells 115 as in the spacer grids 111 of the KSNP skeleton shown in FIG. 2A. The tip 359a is projected and thus can be inserted into the cells 115 to weld the tube location with the guide and instrumentation tubes of the spacer grids, walls between adjacent ones of the cells 115 and the guide tubes 120 or the instrumentation tube 130. This can be seen more easily in FIG. 10 showing an actual welding picture.

Figure 9B:
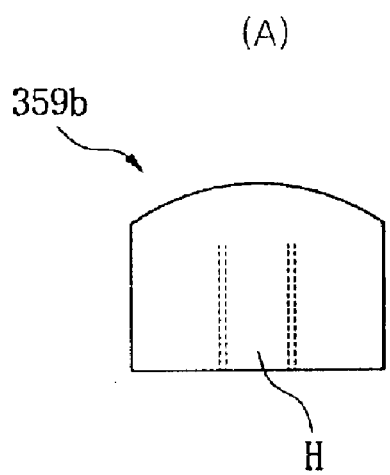
FIG. 9B is side elevation and plan views of another welding gun tip.
Figure 9B:
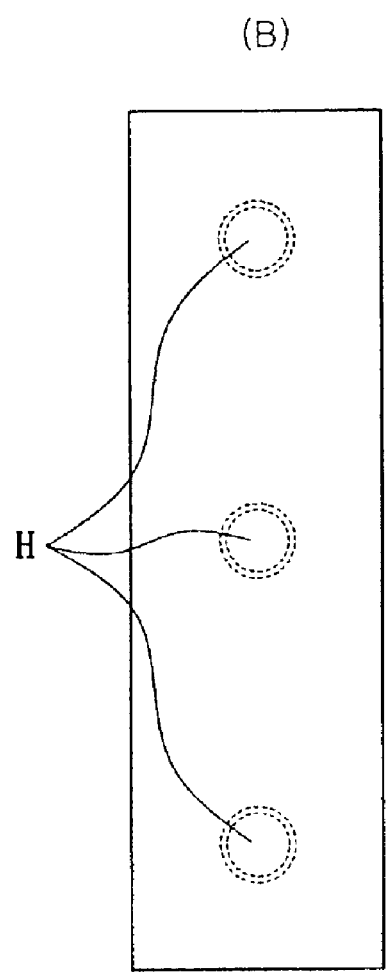

On the contrary, a tip 359b shown in FIG. 9B is provided for any type such as the spacer grid 113 of the 'Advanced Fuel Skeleton' in FIG. 2B. The tip 359b is not protrusive since it is not inserted into the cells of the spacer grid. Rather, the tip 359b is rectangular-shaped to readily wrap an outer periphery of the cylindrical sleeve 113a. Further, the tip 359b does not interfere with the surrounding spacer grid 113 due to its structure contacting with the sleeve 113a. As a result, it is not necessary to precisely control the position of the tip 359b.

The reference number H in FIGS. 9A and 9B designates holes into which bolts are inserted for coupling between the tips 359a and 359b and the tip holder 357.

Such a welding gun 350 is preferably in the form of two holder devices in order to weld the KSNP or 'Advanced Fuel Skeleton' spacer grids 111 or 113 with the guide tubes or the instrumentation tube at both the grids 111 or 113.

The controller 600 controls those components described above. The controller 600 includes a robot control block 620, which is mounted with a dedicated control system for control of the robot, and a machine control block 610 (FIG. 1B) The machine control block 610 includes the control panel 611 (FIGS. 1A, 4A and 4B) equipped in the welding bench 200 and a control panel 613 (FIGS. 6A and 6B) equipped in the push table 500.

The controller 600 also includes a touch screen 630 (FIG. 1B) equipped in a main control block 610 so that the welding apparatus can be operated based on Man Machine Interface (MMI). The operator can input final instructions to the welding apparatus as well as monitor situations of the welding apparatus via the touch screen 630 which is expressed in graphic.

Hereinafter description will be made about a welding process using the above-mentioned robot spot welding apparatus of the present invention.

For the purpose of ensuring a working space of the welding gun, both the KSNP skeleton and the 'Advanced Fuel Skeleton' undergo a spot welding process in the following sequence: First and second guide tubes in a lower part are welded in first guide tube welding. An instrumentation tube is welded. Third and fourth guide tubes in an upper part are welded in second guide tube welding.

KSNP Skeleton Welding

The KSNP skeleton shown in FIG. 2A has 10 spacer grids in one skeleton 100. Therefore, the dotted spacer grid in the welding bench 200 shown in FIG. 4A indicates the 'Advanced Fuel Skeleton' spacer grid 113 for use in the skeleton shown in FIG. 2B.

The KSNP skeleton is set to an operation mode via the touch screen 630 in the controller 600, the ten spacer grids 111 are mounted on the clamping frames 220 and fixed thereto via bolts.

First Guide Tube Welding

When a start button for the first and second guide tubes 120a and 120b is touched on the touch screen 630, the robot 300 moves to the first spacer grid 110 in the lower fixing plate and then waits for a welding command. The welding was performed from the lower part to the upper part in the KSNP skeleton (from 1 to 10 except for the dotted grid).

The operator manipulates a switch in the control panel 613 of the push table 500 and for the air cylinder 237 for driving the upper fixing plate 230 (FIG. 5A) to closely contact to the upper fixing plate 230 toward the 10th clamping frame and fix the lower plate 240 (FIG. 5C) to a designated position.

In FIGS. 1A and 6A, upon completing installation of the spacer grids 110 and movement of the robot 300, the operator confirms whether the push table 500 is placed at positions for the first and second guide tubes 120a and 120b, and inserts the guide tubes on the upper plate of the push table 500 into the tube location 117a and 117b (FIG. 2A) of the grid 111 via the protrusion holes 234a and 234b in the upper fixing plate 230 (FIG. 5B).

The operator uses a control stick switch in the control panel 611 of the welding bench 200 to advance the insert motor 511, thereby inserting the guide tubes 120a and 120b into the tube location 117a and 117b of the spacer grid The operator can regulate the rate and direction of the insert motor according to situations that the guide tubes 120a and 120b are inserted into the spacer grid 110. If the guide tubes 120a and 120b are normally inserted, the bolts are inserted through the bolt holes 243a and 243b in the lower plate 240 (FIG. 5D) to fasten into the plugs 127 of the guide tubes 120a and 120b (FIG. 3A). Then, the insert motor 511 is returned to its original position.

Then, in Step 1, the guide tube electrodes 410 (FIG. 7A) in the push table 500 are pushed by their handles 415 into the guide tubes 120a and 120b. In preparation for first guide tube welding, the operator inspects whether a first welding-ready lamp is lighted on the touch screen 630 and then touches a welding button for first guide tube welding. Then, the robot 300 moves to a welding position (a first grid), and inserts the welding tip 359 into the left of the spacer grid (110) (in FIG. 4A).

When the robot 300 transmits a confirmation signal to the controller 600 or a Programmable Logic Controller (PLC) notifying that it arrived a welding position, the PLC operates the pertinent driving cylinder 330 of the welding gun 350 (FIG. 8A).

When the contact pressure-measuring unit 352 (FIG. 8A) reaches a set value of pressure after actuation of the cylinder 330, the PLC instructs a welding command to a welding timer to perform a first spot welding in the left of the first guide tube 120a. Upon detection of an abnormal value of pressure or welding current, the welding apparatus is re-operated according to options (Step 2).

The welding gun 350 has the two arms 353 as described above, the welding gun 350 is horizontally moved so that welding is performed in the right of the first guide tube 120a of the first spacer grid 110. After the welding tip 359 is inserted into the grid, welding is also performed in a right first spot (Step 3).

Then, the welding gun 350 is moved to perform the above Steps 1 to 3 for the purpose of first spot welding of the second guide tube 120b (Step 4).

Upon completion of first spot welding the first and second guide tubes 120a and 120b, the welding gun is turned for approximately 90 deg (Step 5).

Then, the above Steps 1 to 3 are repeated again for the purpose of second spot welding of the second guide tube 120 (Step 6).

The welding gun 350 repeats the above Steps 1 to 3 while moving to perform second spot welding of the first guide tube 120a (step 7).

The above Steps 1 to 7 are repeated from the second to tenth spacer grids.

However, because the 10th spacer grid has a small gap from the upper fixing plate, interference may take place as the robot welding gun enters the 10th spacer grid. In order to avoid this interference, the PLC automatically returns the upper fixing plate 230 through actuation of the cylinder 237 before the robot 300 enters the 10th spacer grid. In completion of spot welding to the first guide tube 120a and 120b, the robot returns to an original position and the operator removes the electrodes 410 out of the guide tubes, thereby completing first guide tube welding.

2. Instrumentation Tube Welding

Upon completion of first welding for the first and second guide tubes 120a and 120b, the welding apparatus performs welding to the instrumentation tube 130.

As the operator manipulates the touch screen 630 to convert to welding mode for the instrumentation tube 130 and then touches an start button, the robot 300 moves to a position for the first spacer grid from the original position and waits for a welding command.

The operator raises the push table 500 to a second position (instrumentation tube position). After raising the push table 500, the upper fixing plate 230 is closely contacted to the upper fixing plate 230 toward the 10th spacer grid, the instrumentation tube 130 is mounted on the insert tool 510. The control stick switch in the control panel 611 of the welding bench is operated to insert the instrumentation tube into the 10th spacer grid.

Upon completion of instrumentation tube insertion, the insert motor is retreated to the original position. The instrumentation tube electrode 420 is coupled to the insert tool 510 through the groove 429b of the fastener 429 and then connected to a signal device of the inner electrode for instrumentation tube welding-driving cylinder so that the electrode member 421 is automatically expanded/contracted via the expansion mechanism 423. Then, the electrode 420 is inserted into the instrumentation tube via the insert motor 511.

In respect to retreat of the electrode 420 (i.e., upward movement from the position for the first spacer grid to a position for the tenth spacer grid), the PLC or the controller controls the electrode to expand, contract and retreat at fulfillment of welding conditions according to the spacer grids.

Upon completion the above operating conditions, the operator inspects whether a ready lamp for welding the instrumentation tube is lighted on the touch screen 630 and then touches a welding-start button for the instrumentation tube.

In Step 1, at actuation of the cylinder 427, the expansion mechanism 425 is drawn by the pulling bar 425a so that the electrode member 421 is expanded to fill the instrumentation tube 130. Then, the robot 300 moves to a welding position and the welding tip 359 is inserted into the left of the spacer grid 110.

In Step 2, when the robot transmits a signal to the PLC or the controller 600 notifying its arrival at the welding position, the PLC operates the pertinent driving cylinder 330 of the welding gun.

When the contact pressure-measuring unit 352 detects a preset value of pressure after actuation of the cylinder, the PLC instructs a welding-execution command to the welding timer to perform first spot welding in the left.

Upon completion of welding in the left, the robot horizontally moves to enter the right of the spacer grid and then performs welding according to substantially same conditions in Step 2 to complete first spot welding (Step 3).

Upon completion of first spot welding of the instrumentation tube 130, the welding gun rotates for 90° (Step 4).

After rotation, the robot repeats above Steps 1 to 3 to complete second spot welding of the instrumentation tube (Step 5).

Upon completion of instrumentation tube welding in the first spacer grid, the electrode member 411 is contracted and the insert motor 511 is retreated to a position for next one of the spacer grids. Then, the electrode member 411 is expanded and the robot 300 repeats above Steps 1 to 5 to carry out instrumentation tube welding from the second to the tenth spacer grids (Step 6).

Further, before the robot enters the 10th spacer grid, the PLC controls the driving cylinder 237 of the upper fixing plate 230 to return as in first and second guide tube welding so as to ensure a space.

Upon completion of instrumentation tube welding, the robot returns to the original position, the operator removes the instrumentation tube electrode 420 out of the instrumentation tube thereby completing instrumentation tube welding.

3. Second Guide Tube Welding

The operator manipulates the touch screen 630 to convert to welding mode for the third and fourth guide tubes 120c and 120d, and then touches an start button for second guide tube welding. The robot 300 moves from the original position to a position for the first spacer grid to wait for a welding command. The operator raises the push table to positions for the third and fourth guide tubes (in the upper part).

The operator manipulates a switch of the air cylinder 237 for driving the upper fixing plate 230 in the control panel 613 of the table 500 so that the upper plate is closely moved toward the tenth clamping frame.

The insert tool 510 is used to insert the third and fourth guide tubes 120c and 120d, which are prepared in the upper plate of the push table 500, into the designated location 117c and 117d (FIG. 2A) via the protrusion holes 234c and 234d of the upper fixing plate 230.

Then, the operator manipulates the control stick switch in the welding bench control panel 611 to advance the insert motor 511 so that the guide tubes are inserted into the pertinent spacer grid.

When the guide tubes are completely inserted, the bolts are inserted through the bolt holes 243c and 243d in the lower plate 240 (FIG. 5D) to fasten into the plugs 127 of the guide tubes 120c and 120d (FIG. 3A). The insert motor 511 is returned to the original position.

After the third and fourth guide tubes are inserted in positions in the spacer grid, the operator inserts the guide tube electrodes 410 into the guide tubes. In preparation for second guide tube welding, the operator inspects whether a second welding-ready lamp is lighted on the touch screen 630 and then touches a welding-start button for second guide tube welding.

Then, the robot carries out welding steps identical with above ① to ⑦ welding steps in first guide tube welding. This can be realized since position values of the first to fourth guide tubes are previously inputted into the robot control block 620, which is designed to automatically convert the position values of the first and second guide tubes into those of the third and fourth guide tubes in response to an operating mode so that coordinates of the robot 300 are automatically converted.

Upon completion of second guide tube welding, the robot returns to the original position. The operator removes the guide tube electrodes out of the guide tubes and moves the push table to a lower end position. Then, the operator touches an initialization switch of the touch screen 630 to complete the welding process for the KSNP skeleton.

In the skeleton prepared via above welding processes such as first guide tube welding, instrumentation tube welding and second guide tube welding, precise inspection is carried out in respect to above welding processes and their subsidiary steps to find any defects in the skeleton.

II. 'Advanced Fuel Skeleton' Fabrication

In the 'Advanced Fuel Skeleton', the eleven spacer grids 113 (including the dotted spacer grid in FIG. 4A) are welded with the four guide tubes and the instrumentation tube. Unlike the KSNP skeleton in FIG. 2A, the guide tubes and the instrumentation tube are welded to the sleeves 113a which are attached to the spacer grids 113.

In the 'Advanced Fuel Skeleton' in FIG. 4A, the first, second, tenth and eleventh spacer grids are welded at both the right and left sleeves 113a, whereas the third to ninth spacer grids are welded at the left sleeves (i.e., the sleeves in the lower part). Selection of welding spots like this is optimized in order to ensure the strength of the final skeleton as well as reduce the number of the welding spots.

The welding process is carried out from the upper part to the lower part in the 'Advanced Fuel Skeleton' unlike the KSNP skeleton. The skeleton is so designed to minimize the influence of welding to the skeleton. For the sake of convenience, hereinafter the uppermost spacer grid will be referred to first one and the lower most spacer grid will be referred to last one unlike those of the KSNP skeleton.

The operator manipulates the touch screen 630 on the controller 600 to set an 'Advanced Fuel Skeleton' operation mode. The eleven improved spacer grids are mounted in position on the clamping frames 220 according to predetermined procedures and then the fixing bolts B in the top and the side of the clamping frames are screwed with a torque wrench to fix the spacer grids (FIG. 4B).

First Guide Tube Welding

When the operator touches an start button of the first and second tubes 120a and 120b, the robot 300 moves from an original position to a position for the first spacer grid 110 and then waits for a welding command.

The operator manipulates a switch of the air cylinder 237 for driving of the upper fixing plate 230 of the welding bench control panel 613 to closely move the upper fixing plate toward the first clamping frame, and manually manipulates the lower fixing plate 240 to closely move toward the eleventh clamping frame.

Upon completing installation of the spacer grids and movement of the robot, the operator inspects whether the push table 500 is positioned corresponding to the first level, and then operates the insert motor 511 to insert the first and second guide tubes 120a and 120b on the push table into the pertinent spacer grid.

After the first and second guide tubes are inserted in position into the spacer grid, the operator inserts the guide tube electrodes 410 on the push table 500 into the first and second guide tubes 120a and 120b. In preparation for first welding, the operator inspects whether a first welding-ready lamp is turned on the touch screen 630, and then touches a welding-start button for first guide tube welding.

The tip 359b to be used in the welding gun 350 for the 'Advanced Fuel Skeleton' is shown in FIG. 9B.

Because the first spacer grid has a small gap from the upper plate 230, interference may take place as the robot 300 enters the first spacer grid. In order to avoid this interference, the cylinder is actuated to retreat the upper plate 230 from the first grid to increase the gap.

In Step 1, after the robot 300 moves to a welding position, the welding gun 350 reaches a welding spot of the left sleeve 113a of the pertinent spacer grid 113 (FIG. 2B).

When the robot transmits a signal to the controller 600 or the PLC notifying its complete arrival at the welding spot, the PLC operates the pertinent driving cylinder 330 of the welding gun.

When the close contact pressure-measuring unit 352 detects a preset value of pressure after actuation of the cylinder, the PLC instructs a welding-execution command to the welding timer to perform welding to a first spot in the left.

Upon detection of an abnormal value of pressure or welding current, the welding apparatus is re-operated according to options.

Upon completion of welding in the left, the robot horizontally moves the welding gun and the tip of the welding gun repeats Step 1 in the right sleeve of the spacer grid to perform welding to a first spot in the right (Step 2).

Upon completion of first spot welding to the first guide tube, the robot moves to a first spot of the second guide tube to repeat above Steps 1 and 2 (Step 3).

Upon completion of first spot welding to the first and second guide tubes (FIGS. 2 and 9), the welding gun rotates for 90 deg (Step 4).

After moving to a second spot of the second guide tube, the robot repeats above steps 1 to 3. Upon completion of welding, the robot moves to a second spot of the first guide tube 120a (Step 5).

The robot repeats above Steps 1 to 3 to weld the second spot of the first guide tube (Step 6).

Upon completion of automatic welding to the first spacer grid, the robot automatically moves to a position for the second spacer grid. After the spaced upper plate is automatically moved to the first spacer grid in a close-contact manner, the robot enters the second spacer grid to repeat above Steps 1 to 6.

Upon completion of welding to the second spacer grid, the third to ninth spacer grids each are welded only at one portion, in particular, the lower part sleeve.

Upon completion of welding to the 10th spacer grid, the robot stands by at a position for the 11th spacer grid. The operator manually returns the lower fixing plate 240 and then touches a welding start switch for the 11th spacer grid so that the robot performs welding to the upper and lower sleeves in the 11th spacer grid in an identical fashion in the above first and second spacer grids.

After welding to the 11th spacer grid is completed like this, the robot returns to the original position and the operator removes the guide tube electrodes 410 out of the guide tubes to complete first guide tube welding.

2. Instrumentation Tube Welding

As the operator manipulates the touch screen to convert to welding mode for the instrumentation tube and then touches a start button of the instrumentation tube, the robot moves from the original position to a position for the first spacer grid and waits for a welding command.

The operator raises the push table to a second level.

Following operations are carried out in combination of Instrumentation Tube Welding (in I. KSNP Skeleton Welding) and First Guide Tube Welding (in II. Advanced Fuel Skeleton Welding).

3. Second Guide Tube Welding

As the operator manipulates the touch screen to initialize second guide tube welding and then touches an insert switch for the third and fourth guide tubes, the robot moves from the original position to a position for the first spacer grid and waits for a welding command. The operator raises the push table 500 to positions for the insert grooves 117c and 117d in the third and fourth guide tubes.

Following operations are carried out in combination of Second Guide Tube Welding (in I. KSNP Skeleton Welding) and First Guide Tube Welding (in II. Advanced Fuel Skeleton Welding).

As set forth above, the robot spot welding apparatus for a nuclear fuel skeleton of the present invention has the following advantages:

First, a skeleton fabrication process is automated by the largest amount in a fashion that the robot having the welding gun spot-welds the spacer grids with the guide tubes and the instrumentation tube so as to enhance the productivity of the skeleton thereby reducing the manufacturing cost thereof. Also, compared to high proficiency required in the conventional manual welding process, high welding precision can be obtained from the automated welding apparatus thereby remarkably reducing the rate of defective skeletons.

Second, the tip of the robot welding gun and the tip holder are improved and modified in their configurations according to welding regions of the spacer grids, the guide tubes and the instrumentation tube in the skeleton so as to enhance workability.

Third, the present invention provides desirable structures of electrode which are inserted into the guide and instrumentation tubes for spot welding. Particularly, the structure of electrode for the instrumentation tube which having dimples can further automate the robot welding process as well as enhance its precision.

Fourth, the welding process using the robot welding apparatus of the present invention can minimize the operation of the robot welding gun thereby reducing the fabrication time.

While the foregoing detailed description has particularly disclosed the robot spot welding apparatus for a nuclear fuel skeleton of the present invention in relation to the KSNP and 'Advanced Fuel Skeleton's, it is not construed that the welding apparatus of the present invention is restricted to the above embodiment.

Further, those skilled in the art can modify the welding apparatus of the present invention for application to other types of nuclear fuel skeleton without departing from the spirit and scope of the present invention.

Moreover, although the specification has omitted detailed description about well-known ideas such as 'spot welding' and structures such as 'robot', they may be easily contrived or devised by those skilled in the art.

What is claimed is:

1. An automatic robot spot welding apparatus for use in a fabrication process of a skeleton, which spot welds guide tubes for power control rods and an instrumentation tube for measuring an intra-reactor status to spacer grids having a plurality of cells into which fuel rods are inserted, the automatic robot spot welding apparatus comprising:

a welding bench including clamping frames, which are uniformly arrayed and have receiving portions for the spacer grids, and have, at both ends of the welding bench, fixing plates for the guide tubes and the instrumentation tube which are inserted into the spacer grids;

a robot moving on a running rail, which is arranged in parallel to the welding bench, and having a welding gun for welding the spacer grids with the guide and instrumentation tubes;

guide tube electrodes for being inserted into the guide tubes for the spot-welding;

an instrumentation tube electrode for being inserted into the instrumentation tube; and a controller having an apparatus control block and a robot control block for controlling components based on a program stored therein.

2. The automatic robot spot welding apparatus as set forth in claim 1, wherein the robot welding gun has a projected tip so that it is inserted into cells adjacent to insert holes in the spacer grids to weld walls of the cells with the guide tubes or the instrumentation tube.

3. The automatic robot spot welding apparatus as set forth in claim 2, wherein the welding gun includes two holder type welding guns to weld the spacer grids with the guide tubes or the tube at both sides of each of the spacer grids.

4. The automatic robot spot welding apparatus as set forth in claim 1, wherein each of the guide tube electrodes includes electrode members positioned in the spacer grids and an electrode supporting rod for connecting the electrode members.

5. The automatic robot spot welding apparatus as set forth in claim 2, wherein each of the guide tube electrodes includes electrode members positioned in the spacer grids and an electrode supporting rod for connecting the electrode members.

6. The automatic robot spot welding apparatus as set forth in claim 3, wherein each of the guide tube electrodes includes electrode members positioned in the spacer grids and an electrode supporting rod for connecting the electrode members.

7. The automatic robot spot welding apparatus as set forth in claim 1, wherein the instrumentation tube has dimples, and the instrumentation tube electrode includes:

electrode members having sections connected via elastic means, an expansion mechanism inserted into the electrode members and for separating the sections from one another to expand the diameter of the electrode members so that the second electrode fills the instrumentation tube, and a cylinder for reciprocating a pulling bar connected to the expansion mechanism in response to a signal of a sensor for detecting positions of the electrode members.

8. The automatic robot spot welding apparatus as set forth in claim 2, wherein the instrumentation tube has dimples, and the instrumentation tube electrode includes:

electrode members having sections connected via elastic means, an expansion mechanism inserted into the electrode members and for separating the sections from one another to expand the diameter of the electrode members so that the second electrode fills the instrumentation tube, and a cylinder for reciprocating a pulling bar connected to the expansion mechanism in response to a signal of a sensor for detecting positions of the electrode members.

9. The automatic robot spot welding apparatus as set forth in claim 3, wherein the instrumentation tube has dimples, and the instrumentation tube electrode includes:

electrode members having sections connected via elastic means, an expansion mechanism inserted into the electrode members and for separating the sections from one another to expand the diameter of the electrode members so that the second electrode fills the instrumentation tube, and a cylinder for reciprocating a pulling bar connected to the expansion mechanism in response to a signal of a sensor for detecting positions of the electrode members.

10. The automatic robot spot welding apparatus as set forth in claim 7, wherein the elastic means of the electrode members are defined by ends of the sections which are integrally connected at a position opposite to the expansion mechanism.

11. The automatic robot spot welding apparatus as set forth in claim 8, wherein the elastic means of the electrode members are defined by ends of the sections which are integrally connected at a position opposite to the expansion mechanism.

12. The automatic robot spot welding apparatus as set forth in claim 9, wherein the elastic means of the electrode members are defined by ends of the sections which are integrally connected at a position opposite to the expansion mechanism.

13. The automatic robot spot welding apparatus as set forth in claim 1, further comprising a push table colinear with the welding bench, wherein the push table includes:

an insert tool for being reciprocated by a first motor for inserting the guide and instrumentation tubes into the designated locations of the spacer grids, a second motor for adjusting the height of the table in response to a signal of a position sensor, and a control panel for regulating forward and reverse rotation of the motors.

14. The automatic robot spot welding apparatus as set forth in claim 2, further comprising a push table colinear with the welding bench, wherein the push table includes:

an insert tool for being reciprocated by a first motor for inserting the guide and instrumentation tubes into the designated location of the spacer grids, a second motor for adjusting the height of the table in response to a signal of a position sensor, and a control panel for regulating forward and reverse rotation of the motors.

15. The automatic robot spot welding apparatus as set forth in claim 3, further comprising a push table colinear with the welding bench, wherein the push table includes:

an insert tool for being reciprocated by a first motor for inserting the guide and instrumentation tubes into the designated location of the spacer grids, a second motor for adjusting the height of the table in response to a signal of a position sensor, and a control panel for regulating forward and reverse rotation of the motors.

16. The automatic robot spot welding apparatus as set forth in claim 7, wherein the instrumentation tube electrode has a fastener with a wheel adjacent to the cylinder, the spot welding apparatus further comprising a push table which is colinear with the welding bench and includes an insert tool being reciprocated by a motor, wherein the instrumentation tube electrode is reciprocated via the fastener connected to the insert tool and detects whether the electrode members are positioned to the spacer grids in welding via the sensor.

17. The automatic robot spot welding apparatus as set forth in claim 8, wherein the instrumentation tube electrode has a fastener with a wheel adjacent to the cylinder, the spot welding apparatus further comprising a push table which is colinear with the welding bench and includes an insert tool being reciprocated by a motor, wherein the instrumentation tube electrode is reciprocated via the fastener connected to the insert tool and detects whether the electrode members are positioned to the spacer grids in welding via the sensor.

18. The automatic robot spot welding apparatus as set forth in claim 9, wherein the instrumentation tube electrode has a fastener with a wheel adjacent to the cylinder, the spot welding apparatus further comprising a push table which is colinear with the welding bench and includes an insert tool being reciprocated by a motor, wherein the instrumentation tube electrode is reciprocated via the fastener connected to the insert tool and detects whether the electrode members are positioned to the spacer grids in welding via the sensor.

19. The automatic robot spot welding apparatus as set forth in claim 1, wherein a first one of the fixing plates arranged in the welding bench is reciprocated on a guide rail by a cylinder controlled by the controller, wherein the plate has protrusions with holes for receiving the guide tubes and a hole for receiving the instrumentation tube, and wherein a second one of the fixing plates is manually reciprocated on the guide rail, and has bolt holes for receiving bolts being screwed into the guide tubes.

20. The automatic robot spot welding apparatus as set forth in claim 2, wherein a first one of the fixing plates arranged in the welding bench is reciprocated on a guide rail by a cylinder controlled by the controller, wherein the plate has protrusions with holes for receiving the guide tubes and a hole for receiving the instrumentation tube, and wherein a second one of the fixing plates is manually reciprocated on the guide rail, and has bolt holes for receiving bolts being screwed into the guide tubes.

21. The automatic robot spot welding apparatus as set forth in claim 3, wherein a first one of the fixing plates arranged in the welding bench is reciprocated on a guide rail by a cylinder controlled by the controller, wherein the plate has protrusions with holes for receiving the guide tubes and a hole for receiving the instrumentation tube, and wherein a second one of the fixing plates is manually reciprocated on the guide rail, and has bolt holes for receiving bolts being screwed into the guide tubes.

22. The automatic robot spot welding apparatus as set forth in claim 1, wherein the tube locations in each of the spacer grids have a central hole for the instrumentation tube and four holes for the guide tubes in upper and lower opposite positions around the instrumentation tube hole.

23. The automatic robot spot welding apparatus as set forth in claim 2, wherein the tube locations in each of the spacer grids have a central hole for the instrumentation tube and four holes for the guide tubes in upper and lower opposite positions around the instrumentation tube hole.

24. The automatic robot spot welding apparatus as set forth in claim 3, wherein the tube locations in each of the spacer grids have a central hole for the instrumentation tube and four holes for the guide tubes in upper and lower opposite positions around the instrumentation tube hole.

25. The automatic robot spot welding apparatus as set forth in claim 1, wherein the spacer grids each have sleeves in the tube locations, wherein the guide and instrumentation tubes are inserted into the sleeves and welded thereto.

26. The automatic robot spot welding apparatus as set forth in claim 25, wherein the tip of the welding gun for welding the sleeves with the guide and instrumentation tubes are rectangular shaped to avoid necessity of precision location.

27. An automatic robot spot welding method of a nuclear fuel skeleton via an automatic robot spot welding apparatus, in which spacer grids each include an instrumentation tube location in a central portion and four guide tube locations in upper and lower opposite positions around the instrumentation tube location, the method comprising the following steps of:

inserting first and second guide tubes into two lower ones of the guide tube locations in each of the spacer grids placed in clamping frames which are arranged on a welding bench, and which are uniformly arrayed and have receiving portions for the spacer grids, and have, at both ends of the welding bench, fixing plates for the guide tubes and the instrumentation tube which are inserted into the spacer grids;

inserting guide tube electrodes into the guide tubes, and welding by a robot welding gun the spacer grids from first one to last one with the guide tubes, wherein each spacer grid is welded in the order of first spot on the first guide tube, first spot on the second guide tube, rotating the welding gun to 90 deg., second spot on the second guide tube and second spot on the first guide tube;

inserting the instrumentation tube into the instrumentation tube location, inserting an instrumentation tube electrode into the instrumentation tube, and welding by the welding gun the spacer grids with the instrumentation tube in the order of first spot on the spacer grids from first one to last one, rotating the welding gun to 90 deg., and second spot on the spacer grids; and inserting third and fourth guide tubes into two upper ones of the guide tube locations in the spacer grids, inserting guide tube electrodes into the guide tubes, and welding by the welding gun the spacer grids with the guide tubes in the order of first spot on the third guide tube, first spot on the fourth guide tube, rotating the welding gun to 90 deg., second spot on the fourth guide tube, and second spot on the third guide tube.

28. The automatic robot spot welding method as set forth in claim 27, wherein the instrumentation tube has dimples, wherein the instrumentation tube electrode includes electrode members having sections connected via elastic means, an expansion mechanism for being inserted into the electrode members to separate the sections from one another to expand a diameter of the electrode members so that the electrode fills the instrumentation tube, and a cylinder for reciprocating a pulling bar connected to the expansion mechanism in response to a signal from a sensor for detecting positions of the electrode members, and wherein the step of welding the instrumentation tube comprises: detecting whether the electrode members are positioned in regions of the spacer grids, if detecting the electrode members in position, actuating the cylinder to pull the expansion mechanism by the pull ing bar to expand the sections, and welding each of the spots by the robot welding gun.

29. The automatic robot spot welding method as set forth in claim 28, wherein the instrumentation tube electrode further includes a fastener with a wheel adjacent to a cylinder, wherein the spot welding apparatus further comprises a push table colinear with the welding bench and having an insert tool which is reciprocated by a motor, wherein the fastener connected to the insert tool reciprocates the instrumentation tube electrode to/from each of the spacer grids subject to welding therewith while a sensor detects whether the electrode members are positioned in the spacer grids subject to welding.

30. The automatic robot spot welding method as set forth in claim 27, wherein the guide tubes and the instrumentation tube are welded with sleeves fixed to the tube locations of the spacer grids.

31. The automatic robot spot welding method as set forth in claim 28, wherein the guide tubes and the instrumentation tube are welded with sleeves fixed to the tube locations of the spacer grids.

32. The automatic robot spot welding method as set forth in claim 29, wherein the guide tubes and the instrumentation tube are welded with sleeves fixed to the tube locations of the spacer grids.

* * * * *